(12) United States Patent
Burke et al.

(10) Patent No.: US 11,556,595 B2
(45) Date of Patent: *Jan. 17, 2023

(54) ATTRIBUTE DIVERSITY FOR FREQUENT PATTERN ANALYSIS

(71) Applicant: salesforce.com, inc., San Francisco, CA (US)

(72) Inventors: Nathan Irace Burke, Brooklyn, NY (US); Kexin Xie, San Mateo, CA (US); Xingyu Wang, San Francisco, CA (US); Wanderley Liu, Sunnyvale, CA (US); David Yourdon, Durham, NC (US)

(73) Assignee: Salesforce, Inc., San Francisco, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/163,081

(22) Filed: Jan. 29, 2021

(65) Prior Publication Data

US 2021/0157847 A1 May 27, 2021

Related U.S. Application Data

(63) Continuation of application No. 16/355,996, filed on Mar. 18, 2019, now Pat. No. 10,963,519.

(51) Int. Cl.
*G06F 16/906* (2019.01)
*G06F 17/18* (2006.01)
(Continued)

(52) U.S. Cl.
CPC ............ *G06F 16/906* (2019.01); *G06F 17/18* (2013.01); *G06K 9/6221* (2013.01); *G06K 9/6272* (2013.01); *G06Q 30/016* (2013.01)

(58) Field of Classification Search
CPC ........ G06F 16/906; G06F 17/18; G06F 16/26; G06F 16/2465; G06K 9/6221; G06K 9/6272; G06Q 30/016
(Continued)

(56) References Cited

U.S. PATENT DOCUMENTS

2018/0052905 A1* 2/2018 Zhicharevich .......... G06F 16/26
2018/0107695 A1* 4/2018 Yang ................... G06F 16/2282

OTHER PUBLICATIONS

Mahmud et. al. "Improvement of K-means Clustering Algorithm with better initial centroids based on weighted average". Dec. 2012. IEEE. 2012 7th International Conference on Electrical and Computer Engineering. pp. 647-650. (Year: 2012).*

(Continued)

*Primary Examiner* — Michael Pham
(74) *Attorney, Agent, or Firm* — Holland & Hart LLP

(57) ABSTRACT

A data processing server may receive a set of data objects for frequent pattern (FP) analysis. The set of data objects may be analyzed using an attribute diversity technique. For the set of data attributes of the set of data objects, the server may arrange the attributes in one or more dimensions. The server may initialize a set of centroids on data points and identify mean values of nearby data points. Based on an iteration of the mean value calculation, the server may identify a set of attributes corresponding to final mean values as being groups of similarly frequent attributes. These groups of similarly frequent attributes may be analyzed using an FP analysis procedure to identify frequent patterns of data attributes.

20 Claims, 11 Drawing Sheets

(51) Int. Cl.
　　　*G06K 9/62*　　　(2022.01)
　　　*G06Q 30/00*　　　(2012.01)
(58) Field of Classification Search
　　　USPC .......................................................... 707/737
　　　See application file for complete search history.

(56) References Cited

OTHER PUBLICATIONS

Chhabra et. al. "Missing Value Imputation using Hybrid K-means and Association Rules". 2018. IEEE. International Conference on Advances in Computing, Communication Control and Networking (ICACCCN2018). pp. 501-509. (Year: 2018).*

Maheshwari et. al. "Data Analytics using Cloud Computing". 2017. IEEE. 2017 9th International Conference on Computational Intelligence and Communication Networks. pp. 82-87 (Year: 2017).*

* cited by examiner

ATTRIBUTE DIVERSITY FOR FREQUENT PATTERN ANALYSIS

CROSS-REFERENCE

The present Application for Patent is a Continuation of U.S. Pat. No. 10,963,519 by Burke et al., entitled "ATTRIBUTE DIVERSITY FOR FREQUENT PATTERN ANALYSIS," filed Mar. 18, 2019; assigned to the assignee hereof, and expressly incorporated by reference herein.

FIELD OF TECHNOLOGY

The present disclosure relates generally to database systems and data processing, and more specifically to attribute diversity for frequent pattern analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support analytics by performing frequent pattern (FP) analysis on data sets to identify meaningful patterns. For example, FP analysis may be performed on a data set of users and associated attribute data to identify user categorizations based on similar attributes. Performing FP analysis on a data set containing data attributes with widely varying distributions may affect the quality of the resulting patterns. For example, if the data set includes data attributes that differ in frequency by multiple orders of magnitude, the FP analysis procedure may discount less common data attributes based on a much larger number of occurrences for more common data attributes. This may result in the determined FPs missing important information related to rare data attribute types (e.g., the less common data attributes).

DETAILED DESCRIPTION

Figure 1:
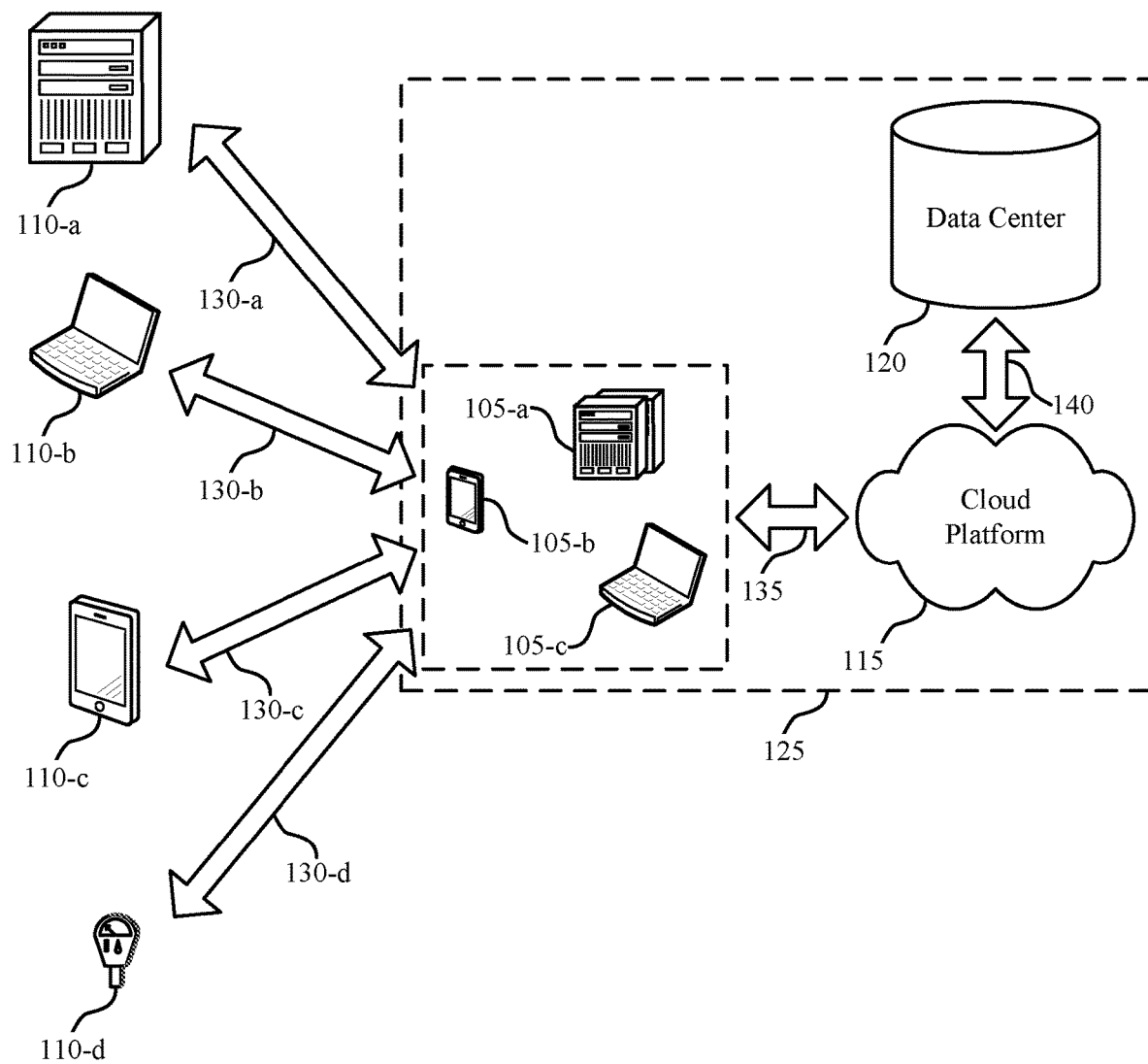
FIG. 1 illustrates an example of a system that supports attribute diversity for frequent pattern analysis in accordance with aspects of the present disclosure.

Some database systems may perform frequent pattern (FP) analysis on data sets to determine common and interesting patterns within the data. These patterns may be useful to users for many customer relationship management (CRM) operations, such as marketing analysis or sales tracking. In some cases, a database system may automatically determine FPs for one or more data sets based on a configuration of the database system. In other cases, the database system may receive a command from a user device (e.g., based on a user input at the user device) to determine FPs for a data set. The database system may determine the FPs within a data set using one or more FP mining techniques. For example, for improved efficiency of the system and for a shorter latency in determining the patterns, the database system may transform the data set into a condensed data structure including an FP-tree and a linked list and may use an FP-growth model to derive the FPs. This condensed data structure may support faster FP mining than the original data set (e.g., a data set stored as a relational database table) can support, as well as faster querying of the determined patterns. For example, because the database system—or, more specifically, a data processing machine (e.g., a bare-metal machine, virtual machine, or container) at the database system—can generate the condensed data structure with just two passes through a data set and because determining the FPs from the condensed data structure may be on a scale of approximately one to two orders of magnitude faster than determining the FPs from the original data, the database system may significantly improve the latency involved in deriving the FPs and the corresponding patterns of interest. Further, if these FPs are stored and processed locally at a data processing machine, the latency involved in querying for the patterns (e.g., by a user device for processing or display) may be greatly reduced, as the data processing machine may handle the query locally without having to request information a database of the database system.

However, in some cases, the patterns derived by the FP-growth model may fail to represent important data characteristics due to a large variance in data distributions for different data attribute types. For example, a data set may contain data objects corresponding to multiple users or user devices in a system, and the data objects may include data attributes corresponding to activities performed by the users or characteristics of the users. Some data attribute types for the users may occur frequently (e.g., web site visits, email communications, sensor readings, etc.), while other data attribute types for the users may occur rarely (e.g., certain transactional events, such as purchasing a product like a house or a car). However, these rarely occurring data attributes for the users may be more important or insightful in determining relevant patterns than hundreds or even thousands of occurrences of the common data attributes. In order to manage the different distributions associated with different data attribute types, the database system may implement attribute diversity techniques to identify useful patterns in the data.

For example, the database system may apply attribute diversity techniques to data before conducting FP analysis by applying a mean shift process to identify sets of attributes within an attribute collection. The resulting merged set of attributes identifies attributes from the less common data attributes of a category, group, or association of users, but which may be informative to the category as a whole. The mean shift process may identify "hidden" groupings of attributes within a dataset, where the groupings have somewhat similar frequencies, occurrences, or other metrics. As such, the process may be useful to identify groupings of attributes which would not be otherwise surfaced by FP analysis because of the low frequencies of attributes relative to high frequency attributes in a data set. The process may include arranging attributes for a set of data objects (e.g., a group of users having associated attributes) in one or more dimensions based on the number of occurrences (e.g., frequency) or other quantities or metrics corresponding to attributes of the set. The process may then define a set of data points on the arranged attributes, and each data point may correspond to a number of occurrences for an attribute or one or more other quantities associated with an attribute. A centroid may be initialized on a subset of the data points, and a mean value is determined for each centroid. Additional centroids may be applied to the mean values and the mean values are recalculated until a realization of a merged set of final mean values. When the final mean values are determined, the database system may identify, for each final mean value, a set of data attributes having data points (e.g., based on a number of occurrences or other metric) within a range of the mean value. These sets of data attributes may correspond to a "category" or set of related attributes. These sets of attributes may be analyzed using a FP analysis procedure to identify interesting patterns of attributes. Accordingly, because groups of related attributes may be analyzed separately by the FP analysis and may be included in the final output, less frequent sets of attributes may be identified as having some pattern within a group, even though those attributes may not be frequent relative to other attributes within the group.

To identify the mean values, the database system may utilize a bandwidth value. In some cases, this bandwidth is also used to determine on which data points to initialize centroids. For example, for a bandwidth value n, every n datapoints may be selected for initializing a centroid. As such, instead of initializing a centroid on every data point, which may incur significant processing overhead due to mean value calculation for every data point, a subset of data points may be selected for centroid initiation and mean value calculation. Because fewer centroids may be initialized, the processing overhead is decreased relative to using a full set of datapoints for centroid initialization. In some cases, a final set of attributes associated with a mean value (e.g., based on a range) may be discarded because the number of attributes is below a threshold.

Aspects of the disclosure are initially described in the context of an environment supporting an on-demand database service. Aspects of the disclosure are further described in the context of database systems and a process flow diagram. Aspects of the disclosure are further illustrated by and described with reference to apparatus diagrams, system diagrams, and flowcharts that relate to attribute diversity for frequent pattern analysis.

FIG. 1 illustrates an example of a system 100 for cloud computing that supports attribute diversity for frequent pattern analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some systems 100 may include a data center 120 that performs FP analysis to determine common and interesting patterns within a data set. In some cases, the data center 120 may automatically determine FPs for one or more data sets based on a configuration of the data center 120. In other cases, the data center 120 may receive a command from a user device (e.g., a cloud client 105) to determine FPs for a data set. The data center 120 may determine the FPs within a data set using one or more FP mining techniques. For example, the data center 120 may transform the data set into a condensed data structure including an FP-tree and a linked list and may use an FP-growth model associated with the condensed data structure to derive the FPs to improve efficiency and reduce latency for determining the patterns within the system 100. This condensed data structure may support faster FP mining than the original data set (e.g., a data set stored as a relational database table) can support, as well as supporting faster querying of the determined patterns. For example, the data center 120 may significantly improve the latency involved in deriving the FPs and the corresponding patterns of interest for a data set based on generating the condensed data structure with fewer passes through the data set (e.g., via a data processing machine at the data center 120) and determining the FPs from the condensed data structure faster (e.g., one to two orders of magnitude faster) than determining the FPs from the original data set. Further, if these FPs are stored and processed locally at a data processing machine, the latency involved in querying for the patterns (e.g., by a cloud client 105 for processing or display) may be greatly reduced, as the data processing machine may handle the query locally without having to request information from a database of the data center 120.

However, in some cases, the patterns derived by the FP-growth model may fail to represent important data characteristics due to a large variance in data distributions for different data attribute types. For example, a data set may contain data objects corresponding to multiple users or user devices in the system 100 (e.g., cloud clients 105 and/or contacts 110), and the data objects may include data attributes corresponding to activities performed by the users or characteristics of the users. The data attributes may occur at intervals of different orders of magnitudes. For example, a first set of data attribute types may be classified as occurring frequently (e.g., website visits, email communications, sensor readings, etc.), while a second set of attribute types may be classified as occurring rarely (e.g., certain transactional events, such as purchasing product like a house or a car). However, the rarely occurring data attributes (e.g., the second set of data attributes) may be as or more important or insightful in determining relevant patterns for the users in the system 100 than hundreds or even thousands of the frequently occurring data attributes (e.g., the second set of data attributes). In order to manage the different orders of magnitudes for distributions associated with different data attribute types, the data center 120 may implement attribute diversity techniques to analyze the rarely occurring data attributes.

For example, a group of user identifiers may be processed using the attribute diversity techniques described. The data center 120 may arrange the data attributes in one or more dimensions based on the number of occurrences of the attribute (or another metric associated with the attribute) within the group or population being analyzed, initialize centroids on data points corresponding attribute metric, and identify merged mean values using the centroids and a bandwidth. Based on the identified merged mean values, the data center 120 may identify sets of attributes which may be related based on a similar number of occurrences or other metrics. These sets of attributes may local to different tiers of frequencies. The data center 120 may analyze the sets of attributes using FP analysis techniques, and sets of FPs resulting from this pattern identification process are based on these merged mean values. By dynamically implementing the different mean values, the data center 120 may reduce the noise from common data attribute types that occur frequently, while maintaining sensitivity to the uncommon data attribute types that occur rarely.

Conventional systems may implement a single minimum support threshold, across all data attributes to identify interesting attributes. If this value is set low to avoid filtering out the rarely occurring uncommon data attribute types, the frequently occurring common data attribute types may introduce a large amount of noise to the pattern derivation process. If the minimum support threshold, is set to a high value to mitigate the noise of the frequently occurring common data attribute types, the threshold may filter out the rarely occurring uncommon data attribute types. These issues may be prevalent in conventional systems when handling data sets including attribute types with frequencies differing by one or more orders of magnitude.

In contrast, the system 100 may implement adaptive mean calculation of data attributes, which serves to cluster the data attributes by similar data distributions into different groups. Based on the adaptive categorization and dynamic mean value calculation, a data center 120 in the system 100 may automatically update with each new or updated data set for FP analysis and attribute diversity for FP analysis. The attribute diversity process may mitigate the noise from common data attribute types while maintaining the sensitivity of the FP mining process to the less common data attribute types (e.g., rarely occurring data attribute types). In this way, the resulting patterns may capture important information related to rare activities or events due to frequency thresholds being adjusted for each the groups resulting from the attribute diversity processed.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As an example, the techniques described herein may be implemented when attempting to analyze data attribute types that occur less frequently for a dataset that include one or more users (e.g., cloud clients 105 and/or contacts 110) within a data center 120. The less frequently occurring data attributes (e.g., rare occurring data attributes) may include when a user purchases an object from a website they have visited. While many users in the data center 120 may visit the website and/or with greater regularity than a purchase is made, the actual purchases may provide more valuable information concerning the user or concerning which objects are being purchased. However, a conventional FP analysis on the dataset may be skewed toward the data attributes of website visits that occur with higher frequency than the data attributes of purchases made, or the purchases may not be included in the conventional FP analysis altogether based on a threshold that omits their lower frequency. Accordingly, by implementing an attribute diversity process, the data center 120 may identify the purchases accurately for further data analysis. It is to be understood that website visits and purchases are merely examples.

Figure 2:
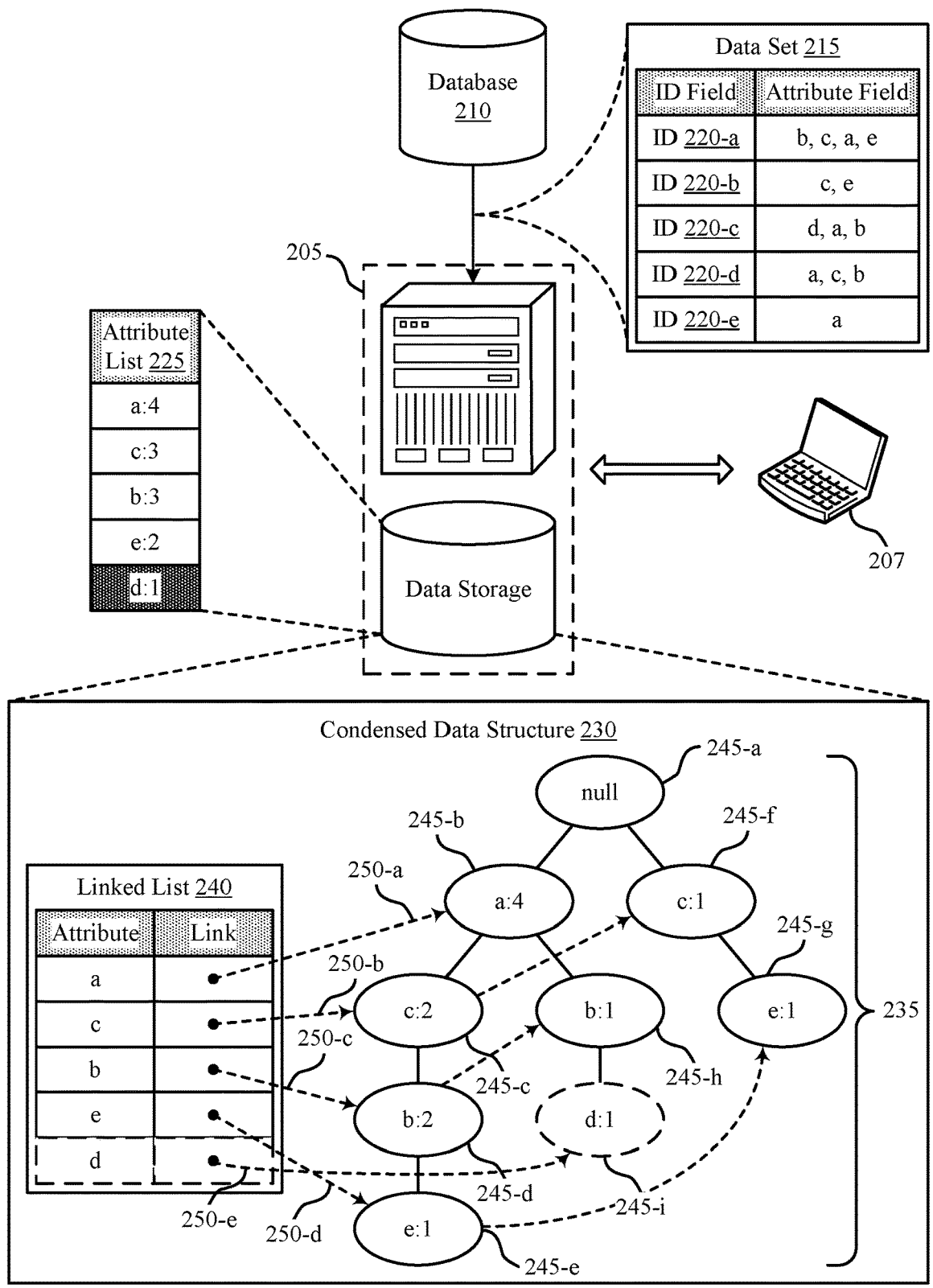
FIG. 2 illustrates an example of a database system that supports attribute diversity for frequent pattern analysis in accordance with aspects of the present disclosure.

FIG. 2 illustrates an example of a database system 200 implementing an FP analysis procedure in accordance with aspects of the present disclosure. The database system 200 may be an example of a data center 120 as described with reference to FIG. 1, and may include a database 210 and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random-access memory (RAM)), memory cache, cloud storage system, or combination thereof. The data processing machine 205 may perform an FP analysis on a data set 215 (e.g., based on a user input command or automatically based on a configuration of the database system 200 or a supported FP-based application).

As described herein, the database system 200 may implement an FP-growth model for pattern mining that utilizes a condensed data structure 230. The condensed data structure 230 may include an FP-tree 235 and a linked list 240 linked to the nodes 245 of the FP-tree 235 via links 250. However, it is to be understood that the database system 200 may alternatively use other FP analysis techniques and data structures than those described. For example, the database system 200 may use a candidate set generation-and-test technique, a tree projection technique, or any combination of these or other FP analysis techniques. In other cases, the database system 200 may perform an FP analysis procedure similar to the one described herein but containing fewer, additional, or alternative processes to those described. The distribution processes described may be implemented with the FP-growth technique and the condensed data structure 230, or with any other FP analysis technique or data structure.

The data processing machine 205 may receive a data set 215 for processing. For example, the database 210 may transmit the data set 215 to the data processing machine 205 for FP analysis. The data set 215 may include multiple data objects, where each data object includes an identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database or application server). The database 210 may transmit the data set 215 to the data processing machine 205 based on the received user input.

Each data object in the data set 215 may be identified based on an ID 220 and may be associated with one or more data attributes. These data attributes may be unique to that data object or may be common across multiple data objects. In some cases, an ID 220 may be an example of a text string unique to that data object. For example, if the data objects correspond to users in the database system 200, the IDs 220 may be user identification numbers, usernames, social security numbers, or some other similar form of ID where each value is unique to a user. The data attributes may be examples of activities performed by a data object (e.g., a user) or characteristics of the data object. For example, the data attributes may include information related to user devices operated by a user (e.g., internet protocol (IP) addresses, a total number of devices operated, etc.), information related to activities performed by the user while operating one of the user devices (e.g., web search histories, software application information, email communications, etc.), information related specifically to the user (e.g., information from a user profile, values or scores associated with the user, etc.), or a combination thereof. As illustrated in FIG. 2, these different data attributes may be represented by different letters (e.g., attributes {a}, {b}, {c}, {d}, and {e}).

In the exemplary case illustrated, the data set 215 may include five data objects. The first data object with ID 220-*a* may include data attributes {b, c, a, e}, the second data object with ID 220-*b* may include data attributes {c, e}, the third data object with ID 220-*c* may include data attributes {d, a, b}, the fourth data object with ID 220-*d* may include data attributes {a, c, b}, and the fifth data object with ID 220-*e* may include data attribute {a}. In one example, each data object may correspond to a different user or user device, and each data attribute may correspond to an activity or activity parameter performed by the user or user device. For example, attribute {a} may correspond to a user making a particular purchase online, while attribute {b} may correspond to a user visiting a particular website in a web browser of a user device. These data attributes may be binary values (e.g., Booleans) related to characteristics of a user.

The data processing machine 205 may receive the data set 215, and may construct a condensed data structure 230 based on the data set 215. The construction process may involve two passes through the data set 215, where the data processing machine 205 processes the data attributes for each data object in the data set 215 during each pass. In a first pass through the data set 215, the data processing machine 205 may generate an attribute list 225. The attribute list 225 may include the data attributes contained in the data set 215, along with their corresponding supports (i.e., occurrence frequencies within the data set 215). In some cases, during this first pass, the data processing machine 205 may filter out one or more attributes based on the supports for the attributes and a minimum support threshold, ξ. In these cases, the resulting data attributes included in the attribute list 225 may be referred to as frequent items or frequent attributes. The data processing machine 205 may order the data attributes in the attribute list 225 in descending order of support. For example, as illustrated, data processing machine 205 may identify that attribute {a} occurs four times in the data set 215, attributes {c} and {b} occur three times, attribute {e} occurs two times, and attribute {d} occurs one time. If the minimum support threshold, is equal to two, the data processing machine 205 may remove {d} from the attribute list 225 (or otherwise not include {d} in the attribute list 225) because the support for attribute {d} is less than the minimum support threshold. In some cases, a user may specify the minimum support threshold, using input features of a user interface. The data processing machine 205 may store the attribute list 225 in memory (e.g., temporary memory or persistent memory).

In a second pass through the data set 215, the data processing machine 205 may generate the condensed data structure 230 for efficient FP mining, where the condensed data structure 230 includes an FP-tree 235 and a linked list 240. The data processing machine 205 may generate a root node 245-*a* for the FP-tree 235, and may label the root node 245-*a* with a "null" value. Then, for each data object in the data set 215, the data processing machine 205 may order the attribute fields according to the order of the attribute list 225 (e.g., in descending order of support) and may add or update a branch of the FP-tree 235. For example, the data processing machine 205 may order the data attributes for the first data object with ID 220-*a* in order of descending support {a, c, b, e}. As no child nodes 245 exist in the FP-tree 235, the data processing machine 205 may create new child nodes 245 representing this ordered set of data attributes. The node for the first attribute in the ordered set is created as a child node 245-*b* of the root node 245-*a*, the node for the second attribute is created as a further child node 245-*c* off of this child node 245-*b*, and so on. For example, the data processing machine may create node 245-*b* for attribute {a}, node 245-*c* for attribute {c}, node 245-*d* for attribute {b}, and node 245-*e* for attribute {e} based on the order of descending support. When creating a new node 245 in the FP-tree 235, the data processing machine 205 may additionally set the count for the node 245 to one (e.g., indicating the one instance of the data attribute represented by the node 245).

The data processing machine 205 may then process the second data object with ID 220-*b*. The data processing machine 205 may order the data attributes as {c, e} (e.g., based on the descending order of support as determined in the attribute list 225), and may check the FP-tree 235 for any nodes 245 stemming from the root node 245-*a* that correspond to this pattern. As the first data attribute of this ordered set is {c}, and the root node 245-*a* does not have a child node 245 for {c}, the data processing machine 205 may create a new child node 245-*f* from the root node 245-*a* for attribute {c} and with a count of one. Further, the data processing machine 205 may create a child node 245-*g* off of this {c} node 245-*f*, where node 245-*g* represents attribute {e} and is set with a count of one.

As a next step in the process, the data processing machine 205 may order the attributes for the data object with ID 220-*c* as {a, b, d} and may add this ordered set to the FP-tree 235. In some cases, if data attribute {d} does not have a significantly large enough support value (e.g., as compared to the minimum support threshold, the data processing machine 205 may ignore the {d} data attribute (and any other data attributes that are not classified as "frequent" attributes) in the list of attributes for the data object. In either case, the data processing machine 205 may check the FP-tree 235 for any nodes 245 stemming from the root node 245-*a* that correspond to this ordered set. Because child node 245-*b* for attribute {a} stems from the root node 245-*a*, and the first attribute in the ordered set for the data object with ID 220-*c* is {a}, the data processing machine 205 may determine to increment the count for node 245-*b* rather than create a new node 245. For example, the data processing machine 205 may change node 245-*b* to indicate attribute {a} with a count of two. As the only child node 245 off of node 245-*b* is child node 245-*c* for attribute {c}, and the next attribute in the ordered set for the data object with ID 220-*c* is attribute {b}, the data processing machine 205 may generate a new child node 245-*h* off of node 245-*b* that corresponds to attribute {b} and may assign the node 245-*h* a count of one. If attribute {d} is included in the attribute list 225, the data processing machine 205 may additionally create child node 245-*i* for {d}.

This process may continue for each data object in the data set 215. For example, in the case illustrated, the data object with ID 220-*d* may increment the counts for nodes 245-*b*, 245-*c*, and 245-*d*, and the data object with ID 220-*e* may increment the count for node 245-*b*. Once the attributes—or the frequent attributes, when implementing a minimum support threshold—from each data object in the data set 215 are represented in the FP-tree 235, the FP-tree 235 may be complete in memory of the data processing machine 205 (e.g., stored in local memory for efficient processing and FP mining, or stored externally for improved memory capacity). By generating the ordered attribute list 225 in the first pass through the data set 215, the data processing machine 205 may minimize the number of branches needed to represent the data, as the most frequent data attributes are included closest to the root node 245-*a*. This may support efficient storage of the FP-tree 235 in memory. Additionally, generating the attribute list 225 allows the data processing machine 205 to identify infrequent attributes and remove these infrequent attributes when creating the FP-tree 235 based on the data set 215.

In addition to the FP-tree 235, the condensed data structure 230 may include a linked list 240. The linked list 240 may include all of the attributes from the attribute list 225 (e.g., all of the attributes in the data set 215, or all of the frequent attributes in the data set 215), and each attribute may correspond to a link 250. Within the table, these links 250 may be examples of head of node-links, where the node links point to one or more nodes 245 of the FP-tree 235 in sequence or in parallel. For example, the entry in the linked list 240 for attribute {a} may be linked to each node 245 in the FP-tree 235 for attribute {a} via link 250-*a* (e.g., in this case, attribute {a} is linked to node 245-*b*). If there are multiple nodes 245 in the FP-tree 235 for a specific attribute, the nodes 245 may be linked in sequence. For example, attribute {c} of the linked list 240 may be linked to nodes 245-*c* and 245-*f* in sequence via link 250-*b*. Similarly, link 250-*c* may link attribute {b} of the linked list 240 to nodes 245-*d* and 245-*h*, link 250-*d* may link attribute {e} to nodes 245-*e* and 245-*g*, and—if frequent enough to be included in the attribute list 225—link 250-*e* may link attribute {d} to node 245-*i*.

In some cases, the data processing machine 205 may construct the linked list 240 following completion of the FP-tree 235. In other cases, the data processing machine 205 may construct the linked list 240 and the FP-tree 235 simultaneously, or may update the linked list 240 after adding each data object representation from the data set 215 to the FP-tree 235. The data processing machine 205 may also store the linked list 240 in memory along with the FP-tree 235. In some cases, the linked list 240 may be referred to as a header table (e.g., as the "head" of the node-links are located in this table). Together, these two structures form the condensed data structure 230 for efficient FP mining at the data processing machine 205. The condensed data structure 230 may contain all information relevant to FP mining from the data set 215 (e.g., for a minimum support threshold, ξ). In this way, transforming the data set 215 into the FP-tree 235 and corresponding linked list 240 may support complete and compact FP mining.

The data processing machine 205 may perform a pattern growth method, FP-growth, to efficiently mine FPs from the information compressed in the condensed data structure 230. In some cases, the data processing machine 205 may determine the complete set of FPs for the data set 215. In other cases, the data processing machine 205 may receive a data attribute of interest (e.g., based on a user input in a user interface), and may determine all patterns for that data attribute. In yet other cases, the data processing machine 205 may determine a single "most interesting" pattern for a data attribute or a data set 215. The "most interesting" pattern may correspond to the FP with the highest occurrence rate, the longest list of data attributes, or some combination of a high occurrence rate and long list of data attributes. For example, the "most interesting" pattern may correspond to the FP with a number of data attributes greater than an attribute threshold with the highest occurrence rate, or the "most interesting" pattern may be determined based on a formula or table indicating a tradeoff between occurrence rate and length of the attribute list.

To determine all of the patterns for a data attribute, the data processing machine 205 may start from the head of a link 250 and follow the node link 250 to each of the nodes 245 for that attribute. The FPs may be defined based on a minimum support threshold, which may be the same minimum support threshold as used to construct the condensed data structure 230. For example, if ξ=2, a pattern is only considered "frequent" if it appears two or more times in the data set 215. To identify the complete set of FPs for the data set 215, the data processing machine 205 may perform the mining procedure on the attributes in the linked list 240 in ascending order. As attribute {d} does not pass the minimum support threshold of ξ=2, the data processing machine 205 may initiate the FP-growth method with data attribute {e}.

To determine the FPs for data attribute {e}, the data processing machine 205 may follow link 250-d for attribute {e}, and may identify node 245-e and node 245-g both corresponding to attribute {e}. The data processing machine 205 may identify that data attribute {e} occurs two times in the FP-tree 235 (e.g., based on summing the count values for the identified nodes 245-e and 245-g), and thus has at least the simplest FP of (e:2) (i.e., a pattern including attribute {e} occurs twice in the data set 215). The data processing machine 205 may determine the paths to the identified nodes 245, {a, c, b, e} and {c, e}. Each of these paths occurs once in the FP-tree 235. For example, even though node 245-b for attribute {a} has a count of four, this attribute {a} appears together with attribute {e} only once (e.g., as indicated by the count of one for node 245-e). These identified patterns may indicate the path prefixes for attribute {e}, namely {a:1, c:1, b:1} and {c:1}. Together, these path prefixes may be referred to as the sub-pattern base or the conditional pattern base for data attribute {e}. Using the determined conditional pattern base, the data processing machine 205 may construct a conditional FP-tree for attribute {e}. That is, the data processing machine 205 may construct an FP-tree using similar techniques as those described herein, where the FP-tree includes only the attribute combinations that include attribute {e}. Based on the minimum support threshold, and the identified path prefixes {a:1, c:1, b:1} and {c:1}, only data attribute {c} may pass the support check. Accordingly, the conditional FP-tree for data attribute {e} may contain a single branch, where the root node 245 has a single child node 245 for attribute {c} with a count of two (e.g., as both of the path prefixes include attribute {c}). Based on this conditional tree, the data processing machine 205 may derive the FP (ce:2). That is, the attributes {c} and {e} occur together twice in the data set 215, while attribute {e} does not occur at least two times in data set 215 with any other data attribute. For conditional FP-trees with greater than one child node 245, the data processing machine 205 may implement a recursive mining process to determine all eligible FPs that contain the attribute being examined. The data processing machine 205 may return the FPs (e:2) and (ce:2) for the data attribute {e}. In some cases, the data processing machine 205 may not count patterns that simply contain the data attribute being examined as FPs, and, in these cases, may just return (ce:2).

This FP-growth procedure may continue with attribute {b}, then attribute {c}, and conclude with attribute {a}. For each data attribute, the data processing machine 205 may construct a conditional FP-tree. Additionally, because the FP-growth procedure is performed in an ascending order through the linked list 240, the data processing machine 205 may ignore child nodes 245 of the linked nodes 245 when determining the FPs. For example, for attribute {b}, the link 250-c may indicate nodes 245-d and 245-h. When identifying the paths for {b}, the data processing machine 205 may not traverse the FP-tree 235 past the linked nodes 245-d or 245-h, as any patterns for the nodes 245 below this on the tree were already determined in a previous step. For example, the data processing machine 205 may ignore node 245-e when determining the patterns for node 245-d, as the patterns including node 245-e were previously derived. Based on the FP-growth procedure and these conditional FP-trees, the data processing machine 205 may identify additional FPs for the rest of the data attributes in the linked list 240. For example, using a recursive mining process and based on the minimum support threshold of ξ=2, the data processing machine 205 may determine the complete set of FPs: (e:2), (ce:2), (b:3), (cb:2), (ab:3), (acb:2), (c:3), (ac:2), and (a:4).

In some cases, the data processing machine 205 may store the resulting patterns locally in a local data storage component. Additionally or alternatively, the data processing machine 205 may transmit the patterns resulting from the FP analysis to the database 210 for storage or to a user device (e.g., for further processing or to display in a user interface). In some cases, the data processing machine 205 may determine a "most interesting" FP (e.g., (acb:2) based on the number of data attributes included in the pattern) and may transmit an indication of the "most interesting" FP to the user device. In other cases, the user device may transmit an indication of an attribute for examination (e.g., data attribute {c}), and the data processing machine 205 may return one or more of the FPs including data attribute {c} in response.

By transforming the data set 215 into the condensed data structure 230, the data processing machine 205 may avoid the need for generating and testing a large number of candidate patterns, which can be very costly in terms of processing and memory resources, as well as in terms of time. For very large database systems 200, databases 210, or data sets 215, the FP-tree 235 may be much smaller than the size of the data set 215, and the conditional FP-trees may be even smaller. For example, transforming a large data set 215 into an FP-tree 235 may shrink the data by a factor of approximately one hundred, and transforming the FP-tree 235 into a conditional FP-tree may again shrink the data by a factor of approximately one hundred, resulting in very condensed data structures 230 for FP mining.

Additionally or alternatively, the user device 207 may support additional methods for conducting FP analysis at the database system 200. For example, database 210 may include a data set 215 received from a plurality of user devices (e.g., from user device 207). The data set 215 may be associated with an attribute list 225 that may have been determined based on a FP analysis of the data set. After receiving the attribute list 225, the user device 207 may identify a resulting data attribute for analysis (e.g., for further analysis), and may determine a set of input data attributes corresponding to the resulting data attribute for analysis. Ultimately, the database system 200 may calculate a probability change corresponding to a difference between a probability that the resulting data attribute is in a data attribute pattern comprising the set of input data attributes and a probability that the resulting data attribute is in a data attribute pattern not comprising the set of input data attributes. As such, the database system 200 may effectively determine a relevant set of data attribute patterns that relate to the identified resulting data attribute. Accordingly, in performing the FP analysis, the database system 200 may determine a relevant set of data attribute patterns having meaningful density. Thus, when displayed (e.g., at the user device 207), the relevant set of data attribute patterns determined based on the FP analysis may be most-relevant to the user.

In some cases, the data processing machine 205 may perform further analysis on the data set 215, one or more identified patterns, a persona, etc. For example, a user may wish to determine top personas associated with pet owners (e.g., attributes that define or are associated with pet owners). This analysis may be referred to as Segmentation FP analysis. To conduct such an analysis, the data processing machine 205 may look at a variety of attributes that contribute to the intended analysis and use logic (e.g., Boolean logic) to determine relationships between certain attributes and, in effect, narrow the data set. Using the pet owner example described herein, the data processing machine 205 may thus identify users who are pet owners. Subsequently, the data processing machine 205 may begin comparing various other attributes associated with the users identified as pet owners. For example, the data processing machine 205 may analyze the frequency and recentness of the data to conduct a Segmentation FP analysis to determine the top associated personas.

In conducting the Segmentation FP analysis on the set of attributes, the data processing machine 205 may cluster the set of data attribute patterns (e.g., attributes in common to all pet owners) into a set of data attribute pattern groups based at least in part on a pattern association factor and a number of data objects of the plurality of data objects common between data attribute patterns of the data attribute pattern groups. Stated another way, data that matches a frequency threshold (e.g., visited at least X-times) and a recentness threshold (e.g., visited with Y-days) may be grouped. In some examples, the pattern association factor (e.g., the frequency threshold and the recentness threshold) may be modified by a user (e.g., via the user interface).

After clustering the data attribute patterns, the data processing machine 205 may determine a subset of data attribute pattern groups of the set of data attribute pattern groups for display. In some examples, the determination may be based on a level of data object coverage of the subset of data attribute pattern groups and a level of data attribute coverage of the subset of data attribute pattern groups. For example, a top number of data attribute pattern groups (e.g., the top 5 data attribute pattern groups) may ultimately be displayed. Based on the clustering and determination of a top number of groups (e.g., a top number of personas), the groups may be displayed to the user.

In some other cases, the data processing machine 205 may perform a data attribute diversity process to identify groups of related data objects based on attribute frequency or other attribute metrics, and the identified groups may be input into the FP analysis procedure described herein. For example, for a given set of data objects associated with data attributes, the data processing machine may, automatically or based on input from a user (e.g., a user may select or activate a toggle indicating attribute diversity), analyze the associated data attributes to identify the groups. To perform the attribute diversity process, the data processing machine 205 may arrange a set of attributes corresponding to a population of data objects based on the number of occurrences or other metrics corresponding to the attributes. In some cases, the data processing machine 205 generates a sorted array of data attribute occurrences for the group for efficient attribute diversity processing, and each element of the array may correspond to a datapoint for processing.

In further attribute diversity processing, the data processing machine 205 may initialize a number of centroids on the data points corresponding to the attribute occurrences or metrics. In some cases, the centroids are initialized on each data point, and in other cases, the centroids are initialized on a subset of the data points. For example, based on a bandwidth value n, the data processing machine 205 may initialize the centroids on every nth data point. This may help reduce the processing required to identify mean values and resultant groups of data attributes. For each initialized centroid, the data processing machine 205 may calculate a mean value of nearby data points using a bandwidth and the value of the centroid. The resultant set of mean values may be used to initialize additional centroids and to calculate new mean values. The process (e.g., mean value calculation using the new mean values) may be repeated until a merging threshold is satisfied by the set of mean values. In some cases, the merging threshold is based on a delta between the previous mean value and the newly calculated mean value.

Based on the merged (e.g., final) mean values, the data processing machine 205 may identify a set of data points, corresponding to data attribute occurrences/metrics, within a range of the final mean values to identify sets of data attributes. Because the mean values may be distributed across the data attribute occurrence values, the mean values may correspond to different "tiers" of data attribute occurrences, and thus may be utilized to identify groups of attributes, while not being weighted towards the attributes having the highest number of occurrences in the group of data objects. The sets of attributes associated with the final mean value may be input into the FP analysis process to identify interesting patterns of attributes. Because the attributes may be grouped according to the attribute diversity process, any dynamic thresholds to account for frequency are adjusted automatically based on the groupings of attributes. Accordingly, derived FPs consider the less frequent (or otherwise hidden) attributes within a group. Thus, the resultant FPs transmitted to the user device 207 for display to a user may include attributes and patterns that would not be surfaced without the attribute diversity process.

Figure 3:
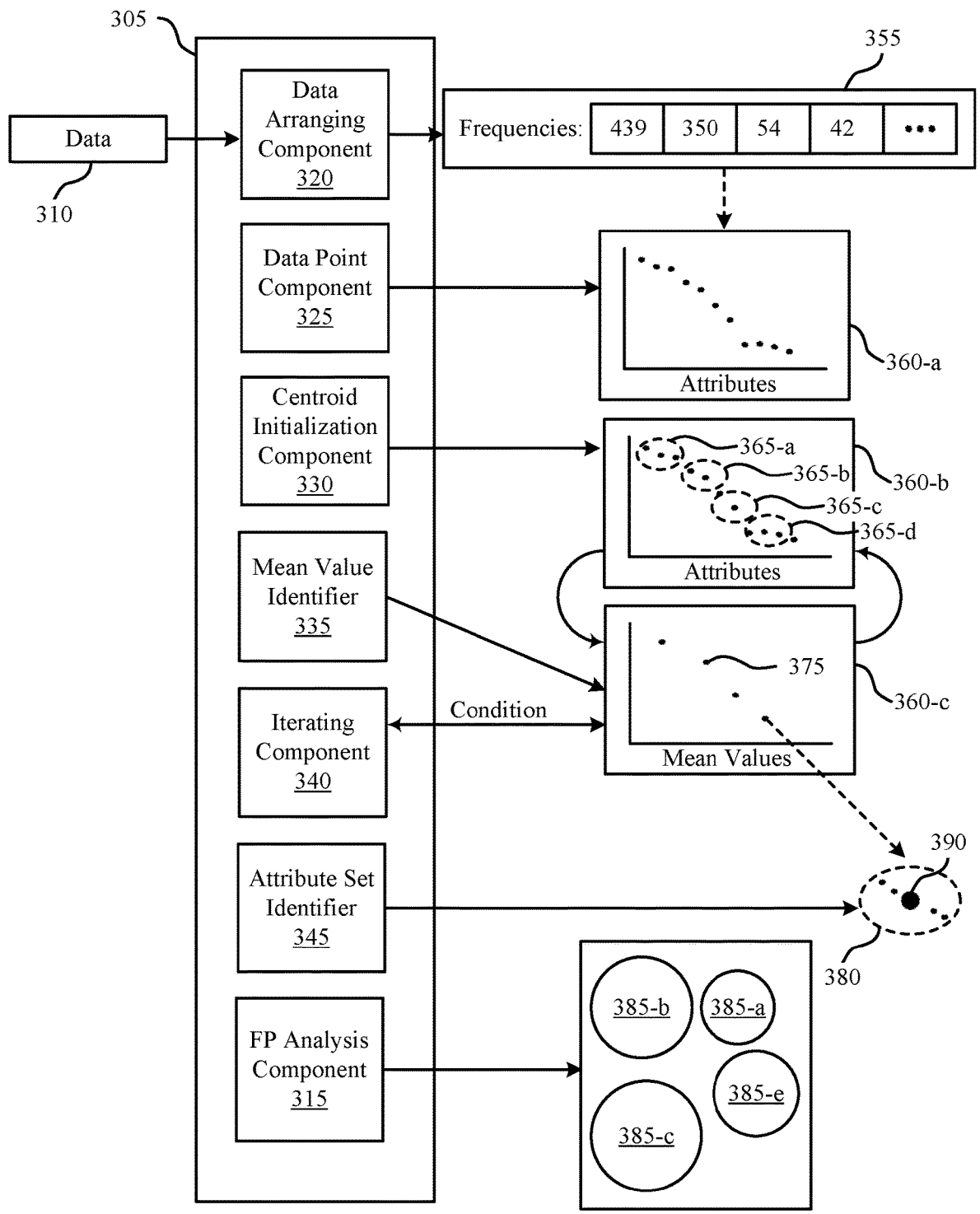
FIG. 3 illustrates an example of a database system that supports attribute diversity for frequent pattern analysis in accordance with aspects of the present disclosure.

FIG. 3 illustrates an example of a database system 300 that supports attribute diversity for frequent pattern analysis in accordance with aspects of the present disclosure. The database system 300 includes a data processing machine 305, which may be an example of aspects of the data processing machine 205 of FIG. 2. The data processing machine 305 includes a FP analysis component 315. The FP analysis component 315 receives a data set 310 from a source, such as an external data source, for FP analysis. Using one or more FP analysis procedures, the FP analysis component identifies a set of attribute patterns 385, which correspond to groups of data objects having an identified pattern of attributes based on the FP analysis procedure. In some cases, these patterns may be referred to as "personas" because the patterns are associated with a group of objects corresponding to users having similar attributes based on monitored online behavior or other interactions. For example, the pattern 385-b corresponds to a group of data objects having first pattern of attributes (e.g., attributes a, b, and c), while the second pattern 385-c corresponds to a group of data objects having a second pattern of attributes (e.g., attributes c, d, f). The FP analysis component 315 may receive data objects and a category mapping function, which is used to map attributes to particular categories. In some cases, the function may be generated by a user.

The patterns 385 produced by the FP analysis procedure may be too "similar" to be interesting to a user. For example, the patterns 385 produced may include a similar set or type of attributes based on the inherent frequency of such attributes. As a specific example, the FP analysis procedure may produce a pattern which has attributes corresponding to a number of website visits. In other words, the pattern includes the attribute set {a, b, c} where, attribute a=1 website visit, attribute b=2 website visits, and attribute c=3 website visits because website visits may be the most frequently monitored or detected attribute of a particular user (e.g., data object). As such, the pattern is not unique or interesting in identifying the object makeup of a particular group of users/objects. The mean shift algorithm may be applied to object identifiers of the data set such as to format the data set for FP analysis to produce "hidden" patterns within a group. These hidden patterns may not have the inherent high frequencies based on the attributes or attribute types, but are nonetheless interesting based on similarities of frequencies (or other metrics) of the attributes.

For the received set of data objects 310, a data attribute arranging component 320 of the data processing machine 305 may arrange one or more attributes associated with the data objects in one or more dimensions. In some cases, the data attribute arranging component 320 may sort the attributes based on the number of occurrences of each data attribute in the set of data objects. For example, the data attribute arranging component 320 may generate a sorted array 355 of the frequencies (e.g., numbers of occurrences) of the data attributes in a group of data objects for efficient data attribute diversity processing. In some cases, the data attribute arranging component may arrange data attributes in multiple dimensions based on metrics (e.g., weights) associated with the attributes. For example, the data attribute arranging component may generate vectors for each data object of the data set 310 based on the metrics associated with he attributes.

A data point component 325 may define a plurality of data points for a set of the arranged attributes. For example, in the case of the array of attribute frequencies, the data point component 325 defines a data point on each number of occurrences (e.g., each frequency of the array 355). This example is demonstrated in a graph 360-a, which illustrates points for example frequencies of attributes in the data set 310. In the multiple dimensional example, the data point component 325 define a subset of datapoints for attributes based on the arranged data. A centroid initialization component 330 initializes a centroid on a subset of the data points. In some cases, the centroid initialization component 330 initializes a centroid on each data point, and in other cases, the centroid initialization component 330 initializes a centroid on fewer than each data point. For example, the centroid initialization component 330 may initialize a centroid based on a bandwidth illustrated by ellipses 365, which may be defined by a bandwidth value n. Thus for every n data points, the centroid initialization component 330 may initialize a centroid. Each ellipse 365 may be initially centered on a data point as illustrated in graph 360-b.

Based on the bandwidth value associated with each initialized bandwidth, a mean value identifier 335 may determine a mean value of the data points within the ellipse 365 of each centroid (e.g., within a range of the centroid based on the bandwidth). In some cases, the mean value identifier 335 identifies those data points within the range of the centroid using a Euclidean distance calculation technique, and the determined distance is compared to the bandwidth value to determine whether the value is within the range. If a data point is within the range of the centroid, then the data point is used in a mean value calculation. The mean value calculation results in a set of mean values (e.g., a mean value 375).

In some cases, to determine a mean value given a bandwidth, the mean value identifier 335 may conduct a "nearest neighbor" search technique, which identifies a kernelized weighted average of data points within a given neighborhood. The mean value identifier 335 may assume a one-dimensional assumption of the data (e.g., the data is stored according to occurrences in an array). For a point p (e.g., a centroid), the mean value identifier 335 identifies the neighbors of p by performing a binary search on the array, until a point is identified within the neighborhood of p (e.g., based on the bandwidth). The mean value identifier may then iterate to the left and right while those identified points are within the neighborhood. The mean value identifier 335 may return an array of each index for a centroid. Those points may be used to calculate the mean value.

In graph 360-c, which illustrates calculated mean values relative to the centroids (and ellipses 365), the data points are not illustrated, but it should be understood that the mean values may be positioned (or valued) relative to the data points (e.g., data attribute occurrences). Using the calculated mean values as new points for centroid initialization, an iterating component 340 iterates the mean value calculation. For example, the calculated mean values are used by the centroid initialization component 330 to initialize new centroids with bandwidth values n. New mean values are calculated using the nearby data points (e.g., based on the bandwidth). In some cases, multiple mean values may merge into one mean value. This process may be repeated until a merging condition is satisfied. In some cases, the merging condition is based on the delta between a previously calculated mean and a newly calculated mean value. If the delta is lower than a threshold, then the mean value may be selected as a final mean value. In some cases, the real calculated mean value for a particular centroid is used as the centroid for the next calculation. In other cases, the nearest datapoint to the real calculated mean value is selected for centroid initialization. In such cases, the mean threshold may be based on whether two iterations produce the same value and/or the value is repeated between two data points.

Using a set of final mean values (e.g., a mean value 390), an attribute set identifier 345 of the data processing machine 305, may identify a set of attributes within a range (e.g., a range defining ellipse or circle 380) of the final mean values. The attributes that fall within a range may be considered local to the final mean value and thus may be considered a group of attributes having similar frequencies or occurrences within the group. Each final mean value may correspond to "plateaus" of attributes within the graph 360, wherein a plateau corresponds to attributes having similar or close frequencies or occurrences. Thus, for each final mean value groups of attributes may be identified that have similar frequencies, and various "plateaus" of attributes are identified using the mean values. As illustrated, mean value 390 is a low frequency mean value, but is used to identify a grouping of attributes having low frequencies. The derived groupings of attributes may be used as in input (e.g., as the category mapping function or result of the data diversity function) into the FP analysis component 315, which performs FP analysis to output patterns 385. Because the attributes are grouped by the attribute diversity process (e.g., categorized by the mean-shift algorithm), the FP analysis procedure may produce interesting patterns including less frequent or occurring attributes because the dynamic thresholds may be "relaxed" within the analyzed groupings (e.g., because of the groupings of various frequencies). Thus, the group corresponding to mean value 390 may represent an interesting attribute pattern that would not be surfaced based on other FP analysis processes.

As an example, a plurality of data objects corresponding to a particular cloud client (e.g., a cloud client 105) may be input for FP analysis. For example, the cloud client 105 transmits the data objects and associated attributes to the server including the data processing machine 305 for FP analysis. Without the attribute diversity process, the FP analysis may produce patterns, when the patterns 385 are viewed by the user, the patterns 385 may not be interesting or informative because the patterns include only high frequency attributes (e.g., to the exclusion of other potentially interesting patterns with relatively lower frequencies). For example, the pattern 385-c represents data objects (e.g., users) that have similar attributes including website visits. Thus, if each identified attribute of pattern 385-c corresponds to a website visit number, then the pattern 385 may not be useful, or at least might convey only an incomplete set of relevant patterns or attribute groupings.

Thus, the user may indicate a preference for attribute diversity for the data set. The data processing machine 305 performs the attribute diversity (e.g., mean step) process as described herein. The mean values derived may include a mean value representing the high frequency attributes (e.g., including website visits) and mean values representing other less frequent or occurring attributes, which are grouped according to similar frequencies/occurrences. Thus, the derived groupings may include sets of attributes which are similar based frequencies or other metrics. For example, a low frequency grouping may include attributes corresponding to a group of users, wherein the attributes signal: 1) interesting in the sport of curling; 2) listens to 1980s hair bands; and 3) travels to San Francisco regularly. Such a grouping of attributes may be hidden in a conventional FP analysis process but, using the attribute diversity procedure to group attributes for FP analysis, may be identified. In some manner, these attributes are informative of the group of users (e.g., data objects).

Using the grouped attributes, the FP analysis component 315 identifies the patterns 385, and because the attributes are grouped according to similar frequencies (in some cases), the threshold for determining whether something is frequent within a group is based on the overall frequency for the group. Thus, the FP analysis component 315 identifies frequent attributes relative to the other attributes within the groups. Accordingly, the FP analysis procedure may identify patterns of attributes including less frequent attributes relative to attributes existing in a majority of the data objects of the data set.

Figure 4:
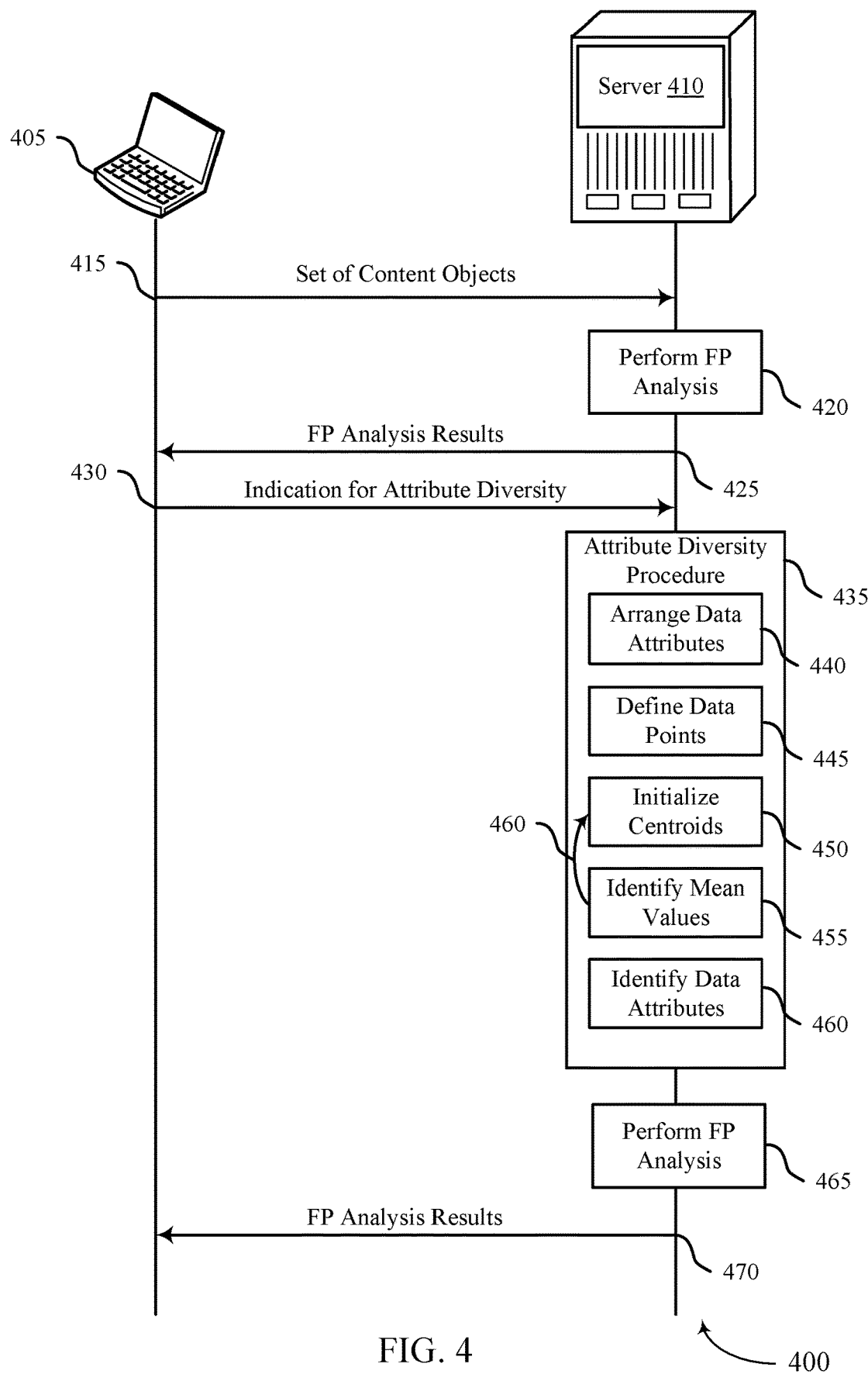
FIG. 4 illustrates an example of a process flow diagram that illustrates attribute diversity for frequent pattern analysis in accordance with aspects of the present disclosure.

FIG. 4 illustrates an example of a process flow diagram 400 that illustrates attribute diversity for frequent pattern analysis in accordance with aspects of the present disclosure. The process flow diagram 400 includes a user device 405, which may be an example of the device 207 of FIG. 2 or a cloud client 105 of FIG. 1. The process flow diagram 400 further includes a server 410, which may be an example of aspects of data system 120 of FIG. 1 or data processing machine 205 and 305 of FIGS. 2-3.

At 415, the user device 405 transmits a set of content objects (e.g., data set) to the server 410 for FP analysis. The set of content objects may be transmitted from another server of data center and may be transmitted via an application programming interface (API) or other endpoint exposed by the server 410. In some cases, the data objects are stored in association with the server 410 (e.g., the data objects are stored in a multi-tenant database accessible or managed by the sever 410), and as such, the transmission at 415 may include an indication of the content objects for FP analysis, which then may be retrieved and analyzed by the server 410.

At 420, the server 410 may perform FP analysis on the received set of content objects. The FP analysis may include segmentation analysis, dynamic threshold analysis, or other forms of FP mining techniques. The FP analysis process may use a condensed data structure including a FP-tree and a linked list and may use a FP-growth model to derive the FPs. The resultant FPs may correspond to a sets of attributes derived from the FP analysis mining technique.

At 425, the server 410 may transmit FP analysis results (e.g., sets of attributes) corresponding to the user device 405. The results may include other information such as the amount of data objects that correspond to each FP, other attributes associated with the data objects corresponding to the FPs, etc. At 430, the user device transmits an indication for attribute diversity. In some cases, the indication may be transmitted responsive to a user selecting a button, toggle, or otherwise activating a user interface.

At 435, the server 410 initiates an attribute diversity procedure. In some cases, the procedure is initiated responsive receiving the indication at 430 or responsive to receiving the FPs generated by the FP analysis procedure. In other cases, the server 410 may periodically execute the procedure or execute the procedure responsive to receiving new data. At 445, the server 410 arranges data attributes associated with the received data objects in one or more dimensions. In some cases, the arranging includes sorting the attributes based on the number of occurrences of the attribute within the plurality of data objects. For example, the server 410 generates an array including the sorted number of occurrences corresponding to attributes associated with users of a particular pattern.

At 445, the server 410 defines a plurality of data points in a set of the arranged data attributes. In some cases, each data point corresponds to a number of occurrences for an attribute in the set of data objects. At 450, the server 410 initializes a plurality of centroids on a subset of the data points. In some cases the centroids are initialized on every nth data point, where n corresponds to a bandwidth value. At 455, for each centroid, the server 455 identifies (e.g., calculates) a mean value of one or more data points of the plurality of data points within a bandwidth of each centroid to generate a set of mean values. In some cases, the determination of whether a data point is within a bandwidth of a centroid is based on a Euclidean distance calculation or other metric. At 460, the data server 410 iterates the identification of mean values using the generated set of mean values as new centroids until satisfaction of a merging threshold by the set of mean values to generate a final set of mean values. The merging threshold may be based on the delta between a new mean value relative to a previously generated mean value. If the delta is less than a threshold, then the merging threshold may be satisfied. In other cases, the iteration may be performed a specific or identified number of times. In some cases, two mean values may merge into one mean value. Thus, the final set of mean values may be less than the initialized set of centroids.

At 460, the server 410 identifies, for each final mean value, a set of data attributes associated with data points within a range of the final mean value. In some cases, the range is based on the bandwidth. In other cases, the range may be adjusted based on the number of data points, range of data points, etc. In some cases, if a count of the set of attributes fails to satisfy the threshold, the set of attributes (e.g., the grouping) may be removed from consideration. At 465, the server 410 performs FP analysis on the sets of attributes to identify frequent patterns. Because the FP analysis procedure uses the sets of attributes grouped based on frequency (in some cases), the FP analysis procedure effectively "relaxes" the threshold for a number of occurrences that may be considered frequent for pattern identification. At 470, the server 410 transmits an indication of the FP analysis results to the user device 405. In some cases, the results are stored at the server 410 for subsequent consideration, viewing, or updating.

Figure 5:
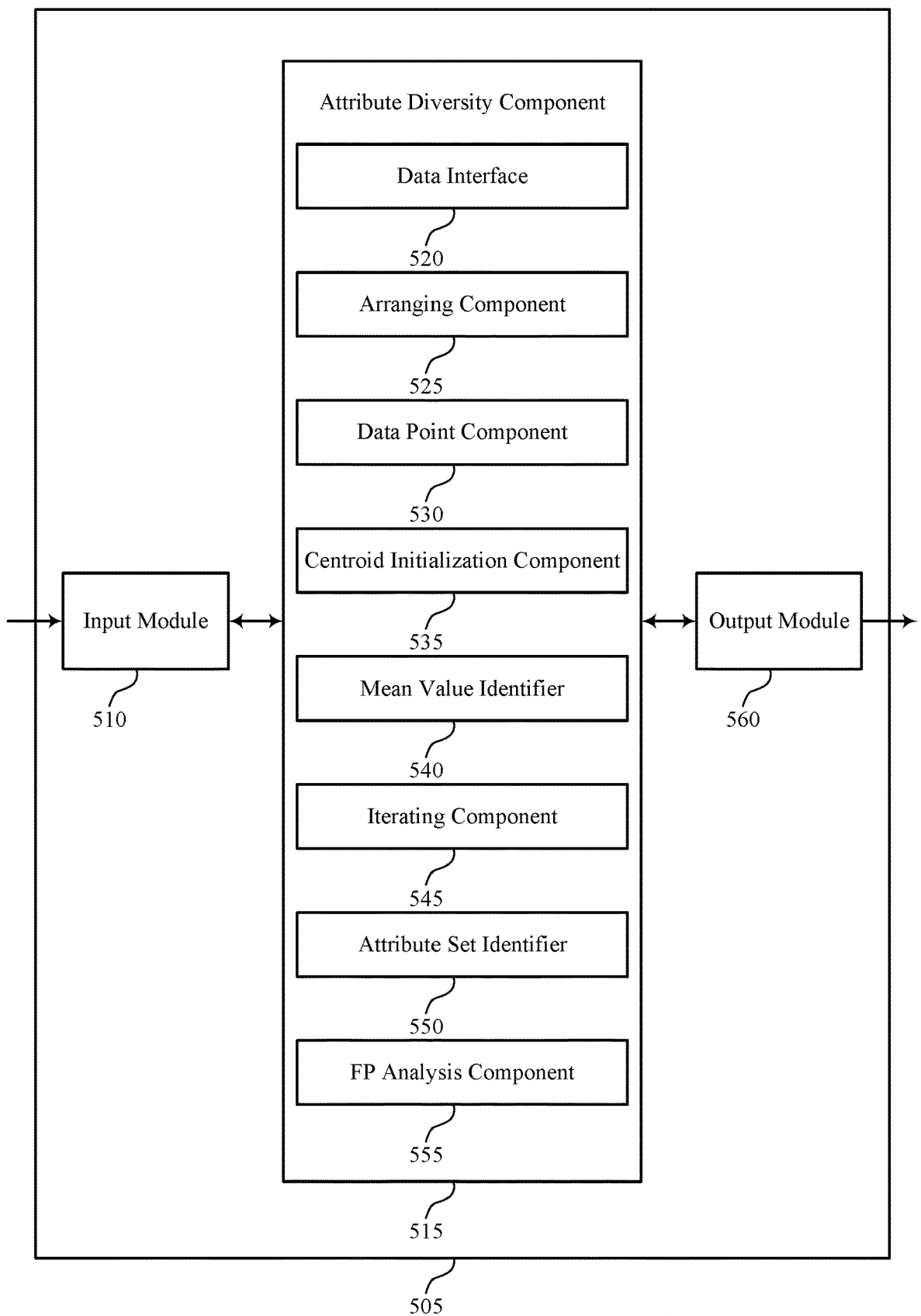
FIG. 5 shows a block diagram of an apparatus that supports attribute diversity for frequent pattern analysis in accordance with aspects of the present disclosure.

FIG. 5 shows a block diagram 500 of an apparatus 505 that supports attribute diversity for frequent pattern analysis in accordance with aspects of the present disclosure. The apparatus 505 may include an input module 510, an attribute diversity component 515, and an output module 560. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the attribute diversity component 515 to support Attribute Diversity for Frequent Pattern Analysis. In some cases, the input module 510 may be a component of an input/output (I/O) controller 715 as described with reference to FIG. 7.

The attribute diversity component 515 may include a data interface 520, an attribute arranging component 525, a data point component 530, a centroid initialization component 535, a mean value identifier 540, an iterating component 545, an attribute set identifier 550, and a FP analysis component 555. The attribute diversity component 515 may be an example of aspects of the attribute diversity component 605 or 710 described with reference to FIGS. 6 and 7.

The attribute diversity component 515 and/or at least some of its various sub-components may be implemented in hardware, software executed by a processor, firmware, or any combination thereof. If implemented in software executed by a processor, the functions of the attribute diversity component 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The attribute diversity component 515 and/or at least some of its various sub-components may be physically located at various positions, including being distributed such that portions of functions are implemented at different physical locations by one or more physical devices. In some examples, the attribute diversity component 515 and/or at least some of its various sub-components may be a separate and distinct component in accordance with various aspects of the present disclosure. In other examples, the attribute diversity component 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data interface 520 may receive, at the database system, a set of data objects, each data object of the set of data objects associated with one or more data attributes. The attribute arranging component 525 may arrange the one or more data attributes along one or more dimensions. The data point component 530 may define a set of data points for a set of the arranged one or more data attributes.

The centroid initialization component 535 may initialize a set of centroids on a subset of the set of data points. The mean value identifier 540 may identify, for each centroid of the set of centroids, a mean value of one or more data points of the set of data points within a bandwidth of each centroid of the set of centroids to generate a set of mean values. The iterating component 545 may iterate the identifying using the set of mean values as the set of centroids until satisfaction of a merging threshold by the set of mean values to generate a set of final mean values. The attribute set identifier 550 may identify, for each final mean value of the set of final mean values, a set of data attributes corresponding to data points within a range of the final mean value. The FP analysis component 555 may perform a frequent pattern (FP) analysis procedure on each set of data attributes corresponding to each final mean value.

The output module 560 may manage output signals for the apparatus 505. For example, the output module 560 may receive signals from other components of the apparatus 505, such as the attribute diversity component 515, and may transmit these signals to other components or devices. In some specific examples, the output module 560 may transmit output signals for display in a user interface, for storage in a database or data store, for further processing at a server or server cluster, or for any other processes at any number of devices or systems. In some cases, the output module 560 may be a component of an I/O controller 715 as described with reference to FIG. 7.

Figure 6:
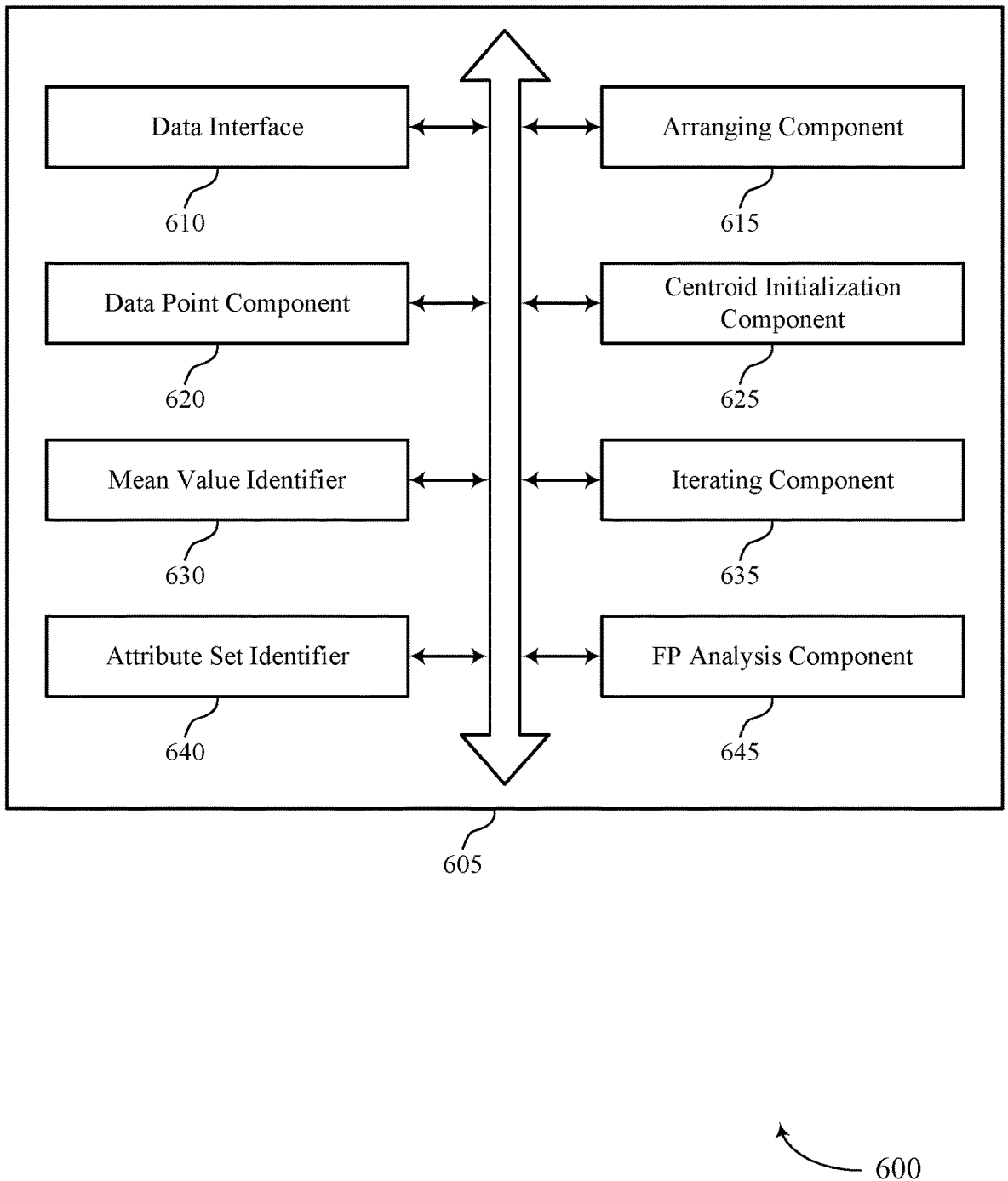
FIG. 6 shows a block diagram of an attribute diversity platform that supports attribute diversity for frequent pattern analysis in accordance with aspects of the present disclosure.

FIG. 6 shows a block diagram 600 of an attribute diversity component 605 that supports attribute diversity for frequent pattern analysis in accordance with aspects of the present disclosure. The attribute diversity component 605 may be an example of aspects of an attribute diversity component 515 or an attribute diversity component 710 described herein. The attribute diversity component 605 may include a data interface 610, an attribute arranging component 615, a data point component 620, a centroid initialization component 625, a mean value identifier 630, an iterating component 635, an attribute set identifier 640, and a FP analysis component 645. Each of these modules may communicate, directly or indirectly, with one another (e.g., via one or more buses).

The data interface 610 may receive, at the database system, a set of data objects, each data object of the set of data objects associated with one or more data attributes. In some cases, the set data attribute patterns corresponds to frequently-occurring conjunctions of data attributes in a user population.

The attribute arranging component 615 may arrange the one or more data attributes along one or more dimensions. In some examples, the attribute arranging component 615 may sort the one or more data attributes associated with the plurality of data objects based on the number of occurrences of each data attribute in the set of data objects, where each data point of the set of data points correspond to the number of occurrences for each attribute associated with the plurality of data objects. In some examples, the attribute arranging component 615 may select the subset of the set of data points for centroid initialization based on the bandwidth. In some examples, the attribute arranging component 615 may select, for a bandwidth value n, every nth data point corresponding to the number occurrences of each data attribute in the set of data attribute patterns for initialization of a centroid of the set of centroids.

The data point component 620 may define a set of data points for a set of the arranged one or more data attributes. The centroid initialization component 625 may initialize a set of centroids on a subset of the set of data points. In some examples, the centroid initialization component 625 may initialize each centroid of the set of centroids on a data point of the set of data points.

The mean value identifier 630 may identify, for each centroid of the set of centroids, a mean value of one or more data points of the set of data points within a bandwidth of each centroid of the set of centroids to generate a set of mean values. In some examples, the mean value identifier 630 may calculate a real mean value for each mean value of the set of mean values based on each centroid, the bandwidth, and the one or more data points of the subset of the set of data points within the bandwidth of each centroid. In some examples, the mean value identifier 630 may calculate the real mean value using a kernelized weighted average process. In some examples, the mean value identifier 630 may select each mean value of the set of mean values as a nearest data point to a calculated real mean value based on each centroid, the bandwidth, and the one or more data points of the subset of the set of data points within the bandwidth of each centroid.

The iterating component 635 may iterate the identifying using the set of mean values as the set of centroids until satisfaction of a merging threshold by the set of mean values to generate a set of final mean values. In some cases, the merging threshold is based on a delta between a previous mean value and a current mean value.

The attribute set identifier 640 may identify, for each final mean value of the set of final mean values, a set of data attributes corresponding to data points within a range of the final mean value. In some examples, the attribute set identifier 640 may remove a set of data attributes for a final mean value if a number of data attributes in the set of data attributes is less than a threshold. In some examples, the attribute set identifier 640 may identify the one or more data points of the subset of the set of data points within the bandwidth of each centroid using a Euclidean distance calculation of a distance between each of the one or more data points and each centroid. The FP analysis component 645 may perform a frequent pattern (FP) analysis procedure on each set of data attributes corresponding to each final mean value.

Figure 7:
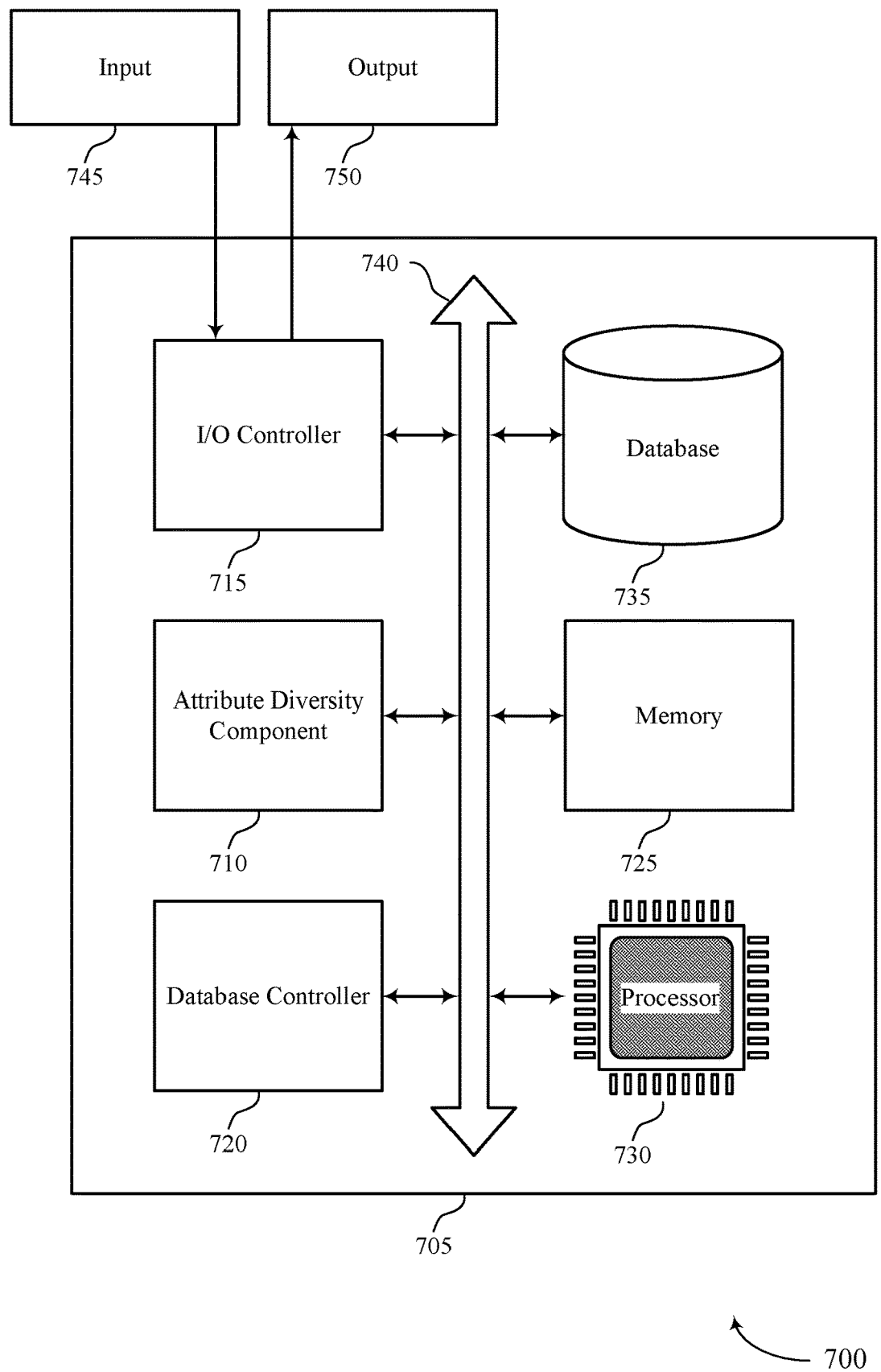
FIG. 7 shows a diagram of a system including a device that supports attribute diversity for frequent pattern analysis in accordance with aspects of the present disclosure.

FIG. 7 shows a diagram of a system 700 including a device 705 that supports attribute diversity for frequent pattern analysis in accordance with aspects of the present disclosure. The device 705 may be an example of or include the components of a database server or an apparatus 505 as described herein. The device 705 may include components for bi-directional data communications including components for transmitting and receiving communications, including an attribute diversity component 710, an I/O controller 715, a database controller 720, memory 725, a processor 730, and a database 735. These components may be in electronic communication via one or more buses (e.g., bus 740).

The attribute diversity component 710 may be an example of an attribute diversity component 515 or 605 as described herein. For example, the attribute diversity component 710 may perform any of the methods or processes described herein with reference to FIGS. 5 and 6. In some cases, the attribute diversity component 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting attribute diversity for frequent pattern analysis).

Figure 8:
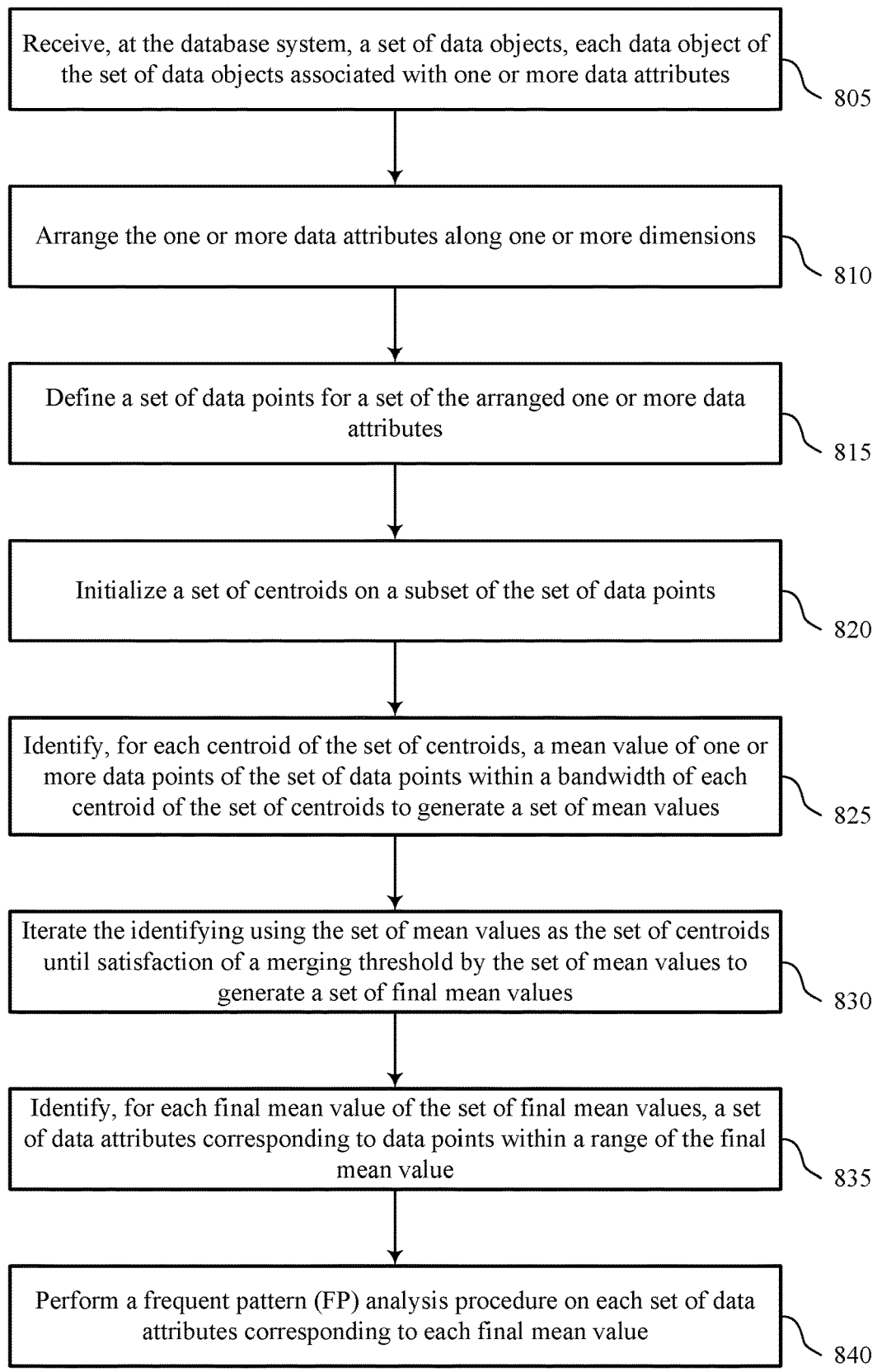
FIGS. 8 through 11 show flowcharts illustrating methods that support attribute diversity for frequent pattern analysis in accordance with aspects of the present disclosure.

FIG. 8 shows a flowchart illustrating a method 800 that supports attribute diversity for frequent pattern analysis in accordance with aspects of the present disclosure. The operations of method 800 may be implemented by a database server or its components as described herein. For example, the operations of method 800 may be performed by an attribute diversity component as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 805, the database server may receive, at the database system, a set of data objects, each data object of the set of data objects associated with one or more data attributes. The operations of 805 may be performed according to the methods described herein. In some examples, aspects of the operations of 805 may be performed by a data interface as described with reference to FIGS. 5 through 7.

At 810, the database server may arrange the one or more data attributes along one or more dimensions. The operations of 810 may be performed according to the methods described herein. In some examples, aspects of the operations of 810 may be performed by an attribute arranging component as described with reference to FIGS. 5 through 7.

At 815, the database server may define a set of data points for a set of the arranged one or more data attributes. The operations of 815 may be performed according to the methods described herein. In some examples, aspects of the operations of 815 may be performed by a data point component as described with reference to FIGS. 5 through 7.

At 820, the database server may initialize a set of centroids on a subset of the set of data points. The operations of 820 may be performed according to the methods described herein. In some examples, aspects of the operations of 820 may be performed by a centroid initialization component as described with reference to FIGS. 5 through 7.

At 825, the database server may identify, for each centroid of the set of centroids, a mean value of one or more data points of the set of data points within a bandwidth of each centroid of the set of centroids to generate a set of mean values. The operations of 825 may be performed according to the methods described herein. In some examples, aspects of the operations of 825 may be performed by a mean value identifier as described with reference to FIGS. 5 through 7.

At 830, the database server may iterate the identifying using the set of mean values as the set of centroids until satisfaction of a merging threshold by the set of mean values to generate a set of final mean values. The operations of 830 may be performed according to the methods described herein. In some examples, aspects of the operations of 830 may be performed by an iterating component as described with reference to FIGS. 5 through 7.

At 835, the database server may identify, for each final mean value of the set of final mean values, a set of data attributes corresponding to data points within a range of the final mean value. The operations of 835 may be performed according to the methods described herein. In some examples, aspects of the operations of 835 may be performed by an attribute set identifier as described with reference to FIGS. 5 through 7.

At 840, the database server may perform a frequent pattern (FP) analysis procedure on each set of data attributes corresponding to each final mean value. The operations of 840 may be performed according to the methods described herein. In some examples, aspects of the operations of 840 may be performed by a FP analysis component as described with reference to FIGS. 5 through 7.

Figure 9:
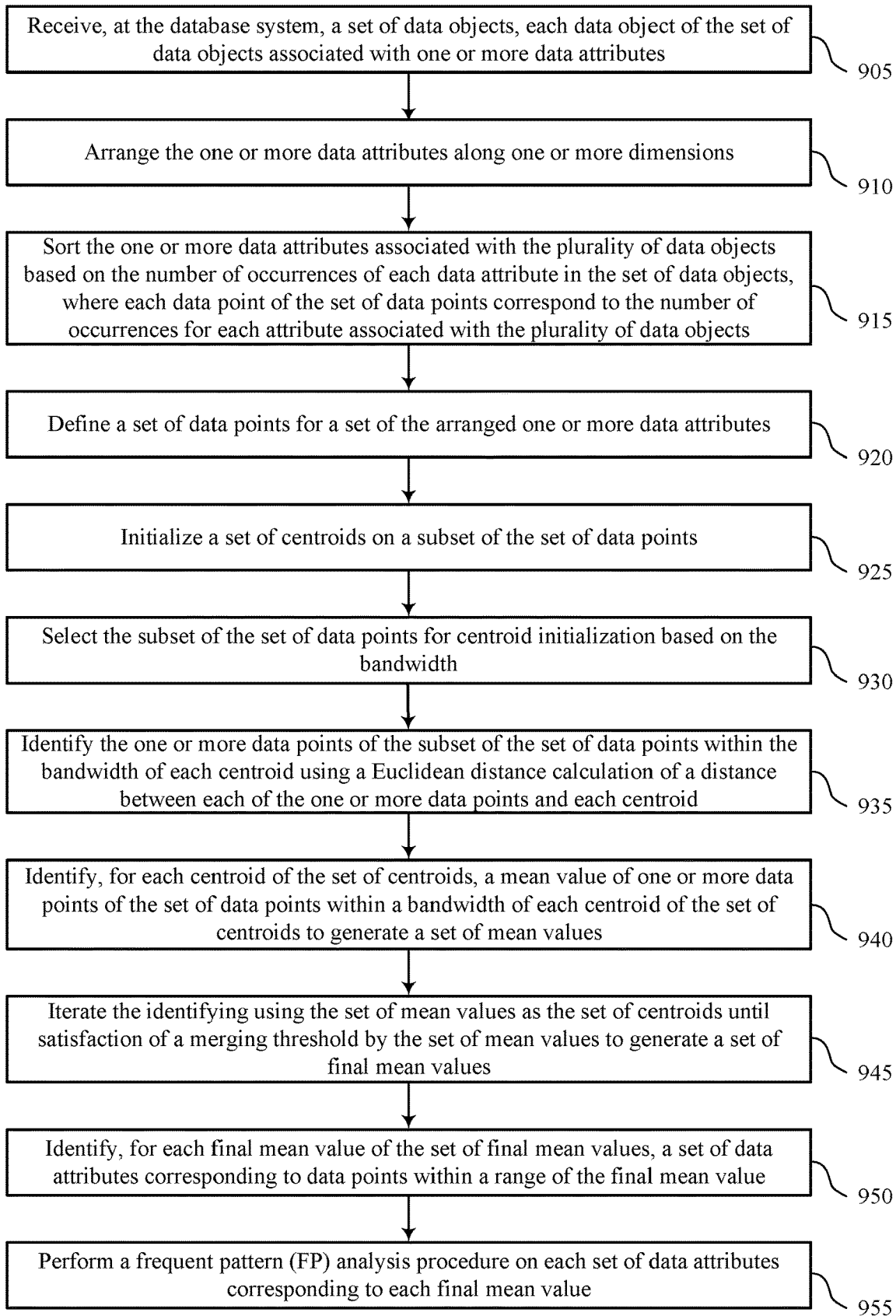

FIG. 9 shows a flowchart illustrating a method 900 that supports attribute diversity for frequent pattern analysis in accordance with aspects of the present disclosure. The operations of method 900 may be implemented by a database server or its components as described herein. For example, the operations of method 900 may be performed by an attribute diversity component as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 905, the database server may receive, at the database system, a set of data objects, each data object of the set of data objects associated with one or more data attributes. The operations of 905 may be performed according to the methods described herein. In some examples, aspects of the operations of 905 may be performed by a data interface as described with reference to FIGS. 5 through 7.

At 910, the database server may arrange the one or more data attributes along one or more dimensions. The operations of 910 may be performed according to the methods described herein. In some examples, aspects of the operations of 910 may be performed by an attribute arranging component as described with reference to FIGS. 5 through 7.

At 915, the database server may sort the one or more data attributes associated with the plurality of data objects based on the number of occurrences of each data attribute in the set of data objects, where each data point of the set of data points correspond to the number of occurrences for each attribute associated with the plurality of data objects. The operations of 915 may be performed according to the methods described herein. In some examples, aspects of the operations of 915 may be performed by an attribute arranging component as described with reference to FIGS. 5 through 7.

At 920, the database server may define a set of data points for a set of the arranged one or more data attributes. The operations of 920 may be performed according to the methods described herein. In some examples, aspects of the operations of 920 may be performed by a data point component as described with reference to FIGS. 5 through 7.

At 925, the database server may initialize a set of centroids on a subset of the set of data points. The operations of 925 may be performed according to the methods described herein. In some examples, aspects of the operations of 925 may be performed by a centroid initialization component as described with reference to FIGS. 5 through 7.

At 930, the database server may select the subset of the set of data points for centroid initialization based on the bandwidth. The operations of 930 may be performed according to the methods described herein. In some examples, aspects of the operations of 930 may be performed by an attribute arranging component as described with reference to FIGS. 5 through 7.

At 935, the database server may identify the one or more data points of the subset of the set of data points within the bandwidth of each centroid using a Euclidean distance calculation of a distance between each of the one or more data points and each centroid. The operations of 935 may be performed according to the methods described herein. In some examples, aspects of the operations of 935 may be performed by an attribute set identifier as described with reference to FIGS. 5 through 7.

At 940, the database server may identify, for each centroid of the set of centroids, a mean value of one or more data points of the set of data points within a bandwidth of each centroid of the set of centroids to generate a set of mean values. The operations of 940 may be performed according to the methods described herein. In some examples, aspects of the operations of 940 may be performed by a mean value identifier as described with reference to FIGS. 5 through 7.

At 945, the database server may iterate the identifying using the set of mean values as the set of centroids until satisfaction of a merging threshold by the set of mean values to generate a set of final mean values. The operations of 945 may be performed according to the methods described herein. In some examples, aspects of the operations of 945 may be performed by an iterating component as described with reference to FIGS. 5 through 7.

At 950, the database server may identify, for each final mean value of the set of final mean values, a set of data attributes corresponding to data points within a range of the final mean value. The operations of 950 may be performed according to the methods described herein. In some examples, aspects of the operations of 950 may be performed by an attribute set identifier as described with reference to FIGS. 5 through 7.

At 955, the database server may perform a frequent pattern (FP) analysis procedure on each set of data attributes corresponding to each final mean value. The operations of 955 may be performed according to the methods described herein. In some examples, aspects of the operations of 955 may be performed by a FP analysis component as described with reference to FIGS. 5 through 7.

Figure 10:
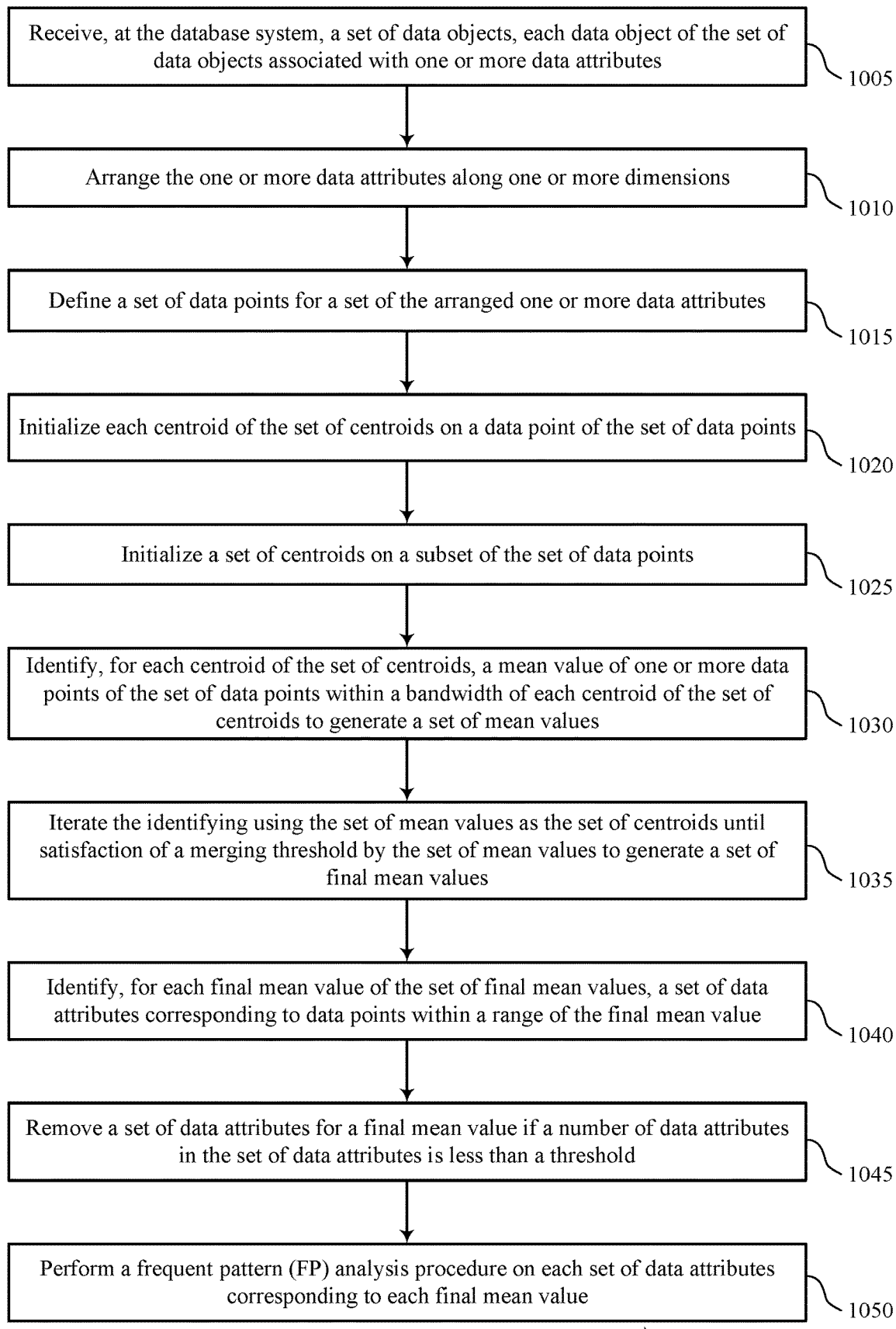

FIG. 10 shows a flowchart illustrating a method 1000 that supports attribute diversity for frequent pattern analysis in accordance with aspects of the present disclosure. The operations of method 1000 may be implemented by a database server or its components as described herein. For example, the operations of method 1000 may be performed by an attribute diversity component as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1005, the database server may receive, at the database system, a set of data objects, each data object of the set of data objects associated with one or more data attributes. The operations of 1005 may be performed according to the methods described herein. In some examples, aspects of the operations of 1005 may be performed by a data interface as described with reference to FIGS. 5 through 7.

At 1010, the database server may arrange the one or more data attributes along one or more dimensions. The operations of 1010 may be performed according to the methods described herein. In some examples, aspects of the operations of 1010 may be performed by an attribute arranging component as described with reference to FIGS. 5 through 7.

At 1015, the database server may define a set of data points for a set of the arranged one or more data attributes. The operations of 1015 may be performed according to the methods described herein. In some examples, aspects of the operations of 1015 may be performed by a data point component as described with reference to FIGS. 5 through 7.

At 1020, the database server may initialize each centroid of the set of centroids on a data point of the set of data points. The operations of 1020 may be performed according to the methods described herein. In some examples, aspects of the operations of 1020 may be performed by a centroid initialization component as described with reference to FIGS. 5 through 7.

At 1025, the database server may initialize a set of centroids on a subset of the set of data points. The operations of 1025 may be performed according to the methods described herein. In some examples, aspects of the operations of 1025 may be performed by a centroid initialization component as described with reference to FIGS. 5 through 7.

At 1030, the database server may identify, for each centroid of the set of centroids, a mean value of one or more data points of the set of data points within a bandwidth of each centroid of the set of centroids to generate a set of mean values. The operations of 1030 may be performed according to the methods described herein. In some examples, aspects of the operations of 1030 may be performed by a mean value identifier as described with reference to FIGS. 5 through 7.

At 1035, the database server may iterate the identifying using the set of mean values as the set of centroids until satisfaction of a merging threshold by the set of mean values to generate a set of final mean values. The operations of 1035 may be performed according to the methods described herein. In some examples, aspects of the operations of 1035 may be performed by an iterating component as described with reference to FIGS. 5 through 7.

At 1040, the database server may identify, for each final mean value of the set of final mean values, a set of data attributes corresponding to data points within a range of the final mean value. The operations of 1040 may be performed according to the methods described herein. In some examples, aspects of the operations of 1040 may be performed by an attribute set identifier as described with reference to FIGS. 5 through 7.

At 1045, the database server may remove a set of data attributes for a final mean value if a number of data attributes in the set of data attributes is less than a threshold. The operations of 1045 may be performed according to the methods described herein. In some examples, aspects of the operations of 1045 may be performed by an attribute set identifier as described with reference to FIGS. 5 through 7.

At 1050, the database server may perform a frequent pattern (FP) analysis procedure on each set of data attributes corresponding to each final mean value. The operations of 1050 may be performed according to the methods described herein. In some examples, aspects of the operations of 1050 may be performed by a FP analysis component as described with reference to FIGS. 5 through 7.

Figure 11:
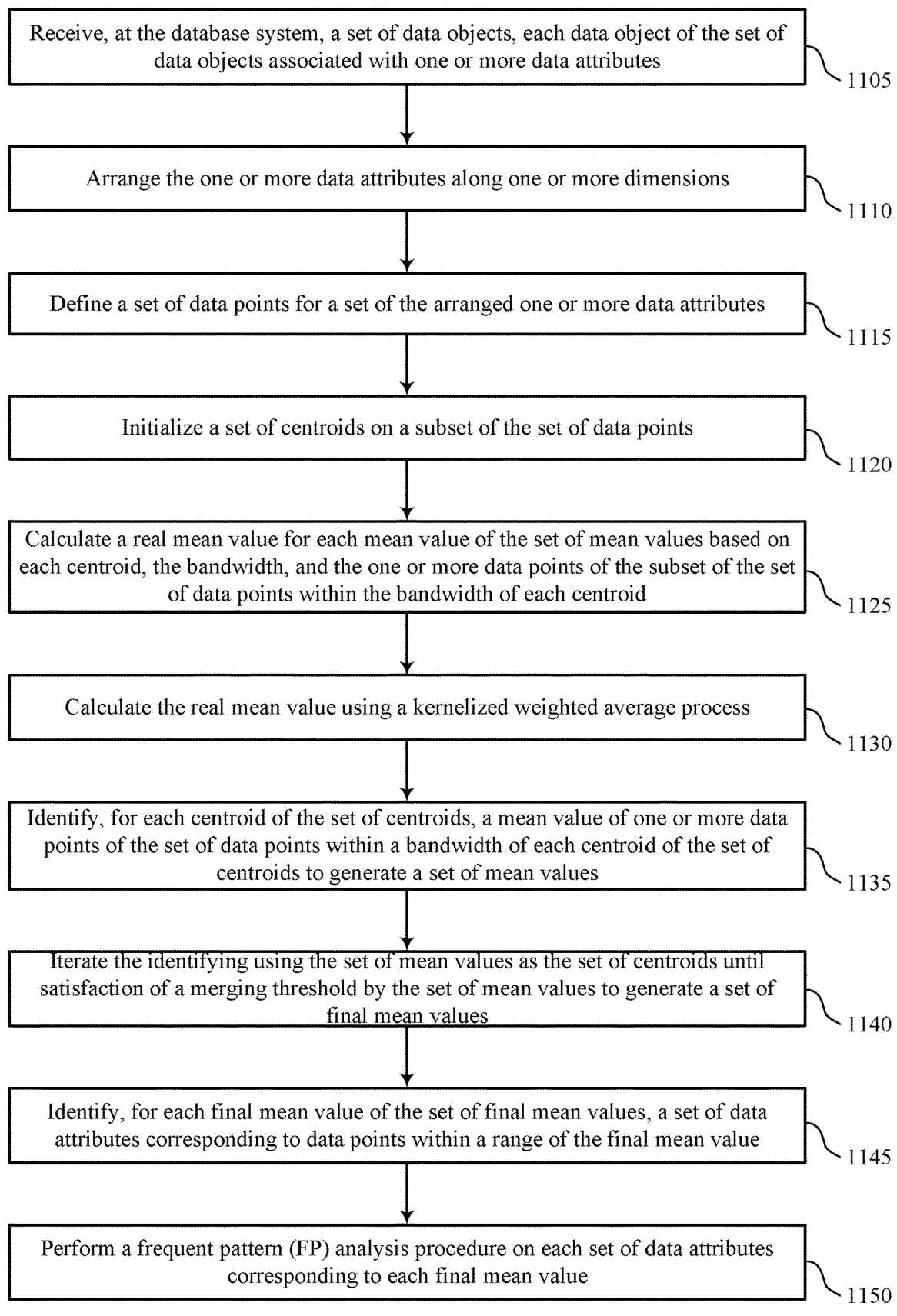

FIG. 11 shows a flowchart illustrating a method 1100 that supports attribute diversity for frequent pattern analysis in accordance with aspects of the present disclosure. The operations of method 1100 may be implemented by a database server or its components as described herein. For example, the operations of method 1100 may be performed by an attribute diversity component as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1105, the database server may receive, at the database system, a set of data objects, each data object of the set of data objects associated with one or more data attributes. The operations of 1105 may be performed according to the methods described herein. In some examples, aspects of the operations of 1105 may be performed by a data interface as described with reference to FIGS. 5 through 7.

At 1110, the database server may arrange the one or more data attributes along one or more dimensions. The operations of 1110 may be performed according to the methods described herein. In some examples, aspects of the operations of 1110 may be performed by an attribute arranging component as described with reference to FIGS. 5 through 7.

At 1115, the database server may define a set of data points for a set of the arranged one or more data attributes. The operations of 1115 may be performed according to the methods described herein. In some examples, aspects of the operations of 1115 may be performed by a data point component as described with reference to FIGS. 5 through 7.

At 1120, the database server may initialize a set of centroids on a subset of the set of data points. The operations of 1120 may be performed according to the methods described herein. In some examples, aspects of the operations of 1120 may be performed by a centroid initialization component as described with reference to FIGS. 5 through 7.

At 1125, the database server may calculate a real mean value for each mean value of the set of mean values based on each centroid, the bandwidth, and the one or more data points of the subset of the set of data points within the bandwidth of each centroid. The operations of 1125 may be performed according to the methods described herein. In some examples, aspects of the operations of 1125 may be performed by a mean value identifier as described with reference to FIGS. 5 through 7.

At 1130, the database server may calculate the real mean value using a kernelized weighted average process. The operations of 1130 may be performed according to the methods described herein. In some examples, aspects of the operations of 1130 may be performed by a mean value identifier as described with reference to FIGS. 5 through 7.

At 1135, the database server may identify, for each centroid of the set of centroids, a mean value of one or more data points of the set of data points within a bandwidth of each centroid of the set of centroids to generate a set of mean values. The operations of 1135 may be performed according to the methods described herein. In some examples, aspects of the operations of 1135 may be performed by a mean value identifier as described with reference to FIGS. 5 through 7.

At 1140, the database server may iterate the identifying using the set of mean values as the set of centroids until satisfaction of a merging threshold by the set of mean values to generate a set of final mean values. The operations of 1140 may be performed according to the methods described herein. In some examples, aspects of the operations of 1140 may be performed by an iterating component as described with reference to FIGS. 5 through 7.

At 1145, the database server may identify, for each final mean value of the set of final mean values, a set of data attributes corresponding to data points within a range of the final mean value. The operations of 1145 may be performed according to the methods described herein. In some examples, aspects of the operations of 1145 may be performed by an attribute set identifier as described with reference to FIGS. 5 through 7.

At 1150, the database server may perform a frequent pattern (FP) analysis procedure on each set of data attributes corresponding to each final mean value. The operations of 1150 may be performed according to the methods described herein. In some examples, aspects of the operations of 1150 may be performed by a FP analysis component as described with reference to FIGS. 5 through 7.

A method of data processing at a database system is described. The method may include receiving, at the database system, a set of data objects, each data object of the set of data objects associated with one or more data attributes, arranging the one or more data attributes along one or more dimensions, defining a set of data points for a set of the arranged one or more data attributes, initializing a set of centroids on a subset of the set of data points, identifying, for each centroid of the set of centroids, a mean value of one or more data points of the set of data points within a bandwidth of each centroid of the set of centroids to generate a set of mean values, iterating the identifying using the set of mean values as the set of centroids until satisfaction of a merging threshold by the set of mean values to generate a set of final mean values, identifying, for each final mean value of the set of final mean values, a set of data attributes corresponding to data points within a range of the final mean value, and performing a frequent pattern (FP) analysis procedure on each set of data attributes corresponding to each final mean value.

An apparatus for data processing at a database system is described. The apparatus may include a processor, memory in electronic communication with the processor, and instructions stored in the memory. The instructions may be executable by the processor to cause the apparatus to receive, at the database system, a set of data objects, each data object of the set of data objects associated with one or more data attributes, arrange the one or more data attributes along one or more dimensions, define a set of data points for a set of the arranged one or more data attributes, initialize a set of centroids on a subset of the set of data points, identify, for each centroid of the set of centroids, a mean value of one or more data points of the set of data points within a bandwidth of each centroid of the set of centroids to generate a set of mean values, iterate the identifying using the set of mean values as the set of centroids until satisfaction of a merging threshold by the set of mean values to generate a set of final mean values, identify, for each final mean value of the set of final mean values, a set of data attributes corresponding to data points within a range of the final mean value, and perform a frequent pattern (FP) analysis procedure on each set of data attributes corresponding to each final mean value.

Another apparatus for data processing at a database system is described. The apparatus may include means for receiving, at the database system, a set of data objects, each data object of the set of data objects associated with one or more data attributes, arranging the one or more data attributes along one or more dimensions, defining a set of data points for a set of the arranged one or more data attributes, initializing a set of centroids on a subset of the set of data points, identifying, for each centroid of the set of centroids, a mean value of one or more data points of the set of data points within a bandwidth of each centroid of the set of centroids to generate a set of mean values, iterating the identifying using the set of mean values as the set of centroids until satisfaction of a merging threshold by the set of mean values to generate a set of final mean values, identifying, for each final mean value of the set of final mean values, a set of data attributes corresponding to data points within a range of the final mean value, and performing a frequent pattern (FP) analysis procedure on each set of data attributes corresponding to each final mean value.

A non-transitory computer-readable medium storing code for data processing at a database system is described. The code may include instructions executable by a processor to receive, at the database system, a set of data objects, each data object of the set of data objects associated with one or more data attributes, arrange the one or more data attributes along one or more dimensions, define a set of data points for a set of the arranged one or more data attributes, initialize a set of centroids on a subset of the set of data points, identify, for each centroid of the set of centroids, a mean value of one or more data points of the set of data points within a bandwidth of each centroid of the set of centroids to generate a set of mean values, iterate the identifying using the set of mean values as the set of centroids until satisfaction of a merging threshold by the set of mean values to generate a set of final mean values, identify, for each final mean value of the set of final mean values, a set of data attributes corresponding to data points within a range of the final mean value, and perform a frequent pattern (FP) analysis procedure on each set of data attributes corresponding to each final mean value.

In some examples of the method, apparatuses, and non-transitory computer-readable medium described herein, arranging the one or more data attributes further may include operations, features, means, or instructions for sorting the one or more data attributes associated with the plurality of data objects based on the number of occurrences of each data attribute in the set of data objects, where each data point of the set of data points correspond to the number of occurrences for each attribute associated with the plurality of data objects.

Some examples of the method, apparatuses, and non-transitory computer-readable medium described herein may further include operations, features, means, or instructions for selecting the subset of the set of data points for centroid initialization based on the bandwidth.

Some examples of the method, apparatuses, and non-transitory computer-readable medium described herein may further include operations, features, means, or instructions for selecting, for a bandwidth value n, every nth data point corresponding to the number occurrences of each data attribute in the set of data attribute patterns for initialization of a centroid of the set of centroids.

Some examples of the method, apparatuses, and non-transitory computer-readable medium described herein may further include operations, features, means, or instructions for initializing each centroid of the set of centroids on a data point of the set of data points.

Some examples of the method, apparatuses, and non-transitory computer-readable medium described herein may further include operations, features, means, or instructions for removing a set of data attributes for a final mean value if a number of data attributes in the set of data attributes may be less than a threshold.

Some examples of the method, apparatuses, and non-transitory computer-readable medium described herein may further include operations, features, means, or instructions for calculating a real mean value for each mean value of the set of mean values based on each centroid, the bandwidth, and the one or more data points of the subset of the set of data points within the bandwidth of each centroid.

Some examples of the method, apparatuses, and non-transitory computer-readable medium described herein may further include operations, features, means, or instructions for calculating the real mean value using a kernelized weighted average process.

Some examples of the method, apparatuses, and non-transitory computer-readable medium described herein may further include operations, features, means, or instructions for selecting each mean value of the set of mean values as a nearest data point to a calculated real mean value based on each centroid, the bandwidth, and the one or more data points of the subset of the set of data points within the bandwidth of each centroid.

Some examples of the method, apparatuses, and non-transitory computer-readable medium described herein may further include operations, features, means, or instructions for identifying the one or more data points of the subset of the set of data points within the bandwidth of each centroid using a Euclidean distance calculation of a distance between each of the one or more data points and each centroid.

In some examples of the method, apparatuses, and non-transitory computer-readable medium described herein, the merging threshold may be based on a delta between a previous mean value and a current mean value.

In some examples of the method, apparatuses, and non-transitory computer-readable medium described herein, the set of data objects includes a set of users within the database system and the set of data attributes includes activities performed by the set of users or characteristics associated with the set of users.

In some examples of the method, apparatuses, and non-transitory computer-readable medium described herein, the set data attribute patterns corresponds to frequently-occurring conjunctions of data attributes in a user population.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a database system, comprising:
   receiving, at the database system, a plurality of data objects, each data object of the plurality of data objects associated with one or more data attributes;
   arranging the one or more data attributes along one or more dimensions;
   defining a plurality of data points for a set of the arranged one or more data attributes;
   initializing a plurality of centroids on a subset of the plurality of data points;
   identifying, for each centroid of the plurality of centroids, a mean value of one or more data points of the plurality of data points within a bandwidth of each centroid of the plurality of centroids to generate a set of mean values;
   identifying, for each mean value of the set of mean values, a set of data attributes corresponding to data points within a range of the mean value; and
   performing a frequent pattern (FP) analysis procedure on each set of data attributes corresponding to each mean value.

2. The method of claim 1, wherein arranging the one or more data attributes further comprises:
   sorting the one or more data attributes associated with the plurality of data objects based on a number of occurrences of each data attribute associated with the plurality of data objects, wherein each data point of the plurality of data points correspond to the number of occurrences for each attribute associated with the plurality of data objects.

3. The method of claim 2, further comprising:
   selecting the subset of the plurality of data points for centroid initialization is based on the bandwidth.

4. The method of claim 3, further comprising:
selecting, for a bandwidth value n, every nth data point corresponding to the number of occurrences of each data attribute for initialization of a centroid of the plurality of centroids.

5. The method of claim 1, further comprising:
iterating identification of the mean value for the one or more data points using the set of mean values as the plurality of centroids until satisfaction of a merging threshold by the set of mean values to generate a set of final mean values, wherein the set of data attributes are identified within the range of each of the final mean values and the FP analysis procedure is performed on each set of data attributes corresponding to each final mean value.

6. The method of claim 5, wherein the merging threshold is based on a delta between a previous mean value and a current mean value.

7. The method of claim 1, further comprising:
initializing each centroid of the plurality of centroids on a data point of the plurality of data points.

8. The method of claim 1, further comprising:
removing a set of data attributes corresponding to a mean based at least in part on a number of data attributes in the set of data attributes being less than a threshold.

9. The method of claim 1, further comprising:
calculating a real mean value for each mean value of the set of mean values based on each centroid, the bandwidth, and the one or more data points of the subset of the plurality of data points within the bandwidth of each centroid.

10. The method of claim 9, further comprising:
calculating the real mean value using a kernelized weighted average process.

11. The method of claim 1, further comprising:
selecting each mean value of the set of mean values as a nearest data point to a calculated real mean value.

12. The method of claim 1, further comprising:
identifying the one or more data points of the subset of the plurality of data points within the bandwidth of each centroid using a Euclidean distance calculation of a distance between each of the one or more data points and each centroid.

13. The method of claim 1, wherein the plurality of data objects comprises a plurality of users within the database system and the set of data attributes comprises activities performed by the plurality of users or characteristics associated with the plurality of users.

14. An apparatus for data processing at a database system, comprising:
a processor;
memory coupled with the processor; and
instructions stored in the memory and executable by the processor to cause the apparatus to:
receive, at the database system, a plurality of data objects, each data object of the plurality of data objects associated with one or more data attributes;
arrange the one or more data attributes along one or more dimensions;
define a plurality of data points for a set of the arranged one or more data attributes;
initialize a plurality of centroids on a subset of the plurality of data points;
identify, for each centroid of the plurality of centroids, a mean value of one or more data points of the plurality of data points within a bandwidth of each centroid of the plurality of centroids to generate a set of mean values;
identify, for each mean value of the set of mean values, a set of data attributes corresponding to data points within a range of the mean value; and
perform a frequent pattern (FP) analysis procedure on each set of data attributes corresponding to each mean value.

15. The apparatus of claim 14, wherein the instructions to arrange the one or more data attributes are further executable by the processor to cause the apparatus to:
sort the one or more data attributes associated with the plurality of data objects based on a number of occurrences of each data attribute associated with the plurality of data objects, wherein each data point of the plurality of data points correspond to the number of occurrences for each attribute associated with the plurality of data objects.

16. The apparatus of claim 14, wherein the instructions are further executable by the processor to cause the apparatus to:
iterate identification of the mean value for the one or more data points using the set of mean values as the plurality of centroids until satisfaction of a merging threshold by the set of mean values to generate a set of final mean values, wherein the set of data attributes are identified within the range of each of the final mean values and the FP analysis procedure is performed on each set of data attributes corresponding to each final mean value.

17. The apparatus of claim 14, wherein the instructions are further executable by the processor to cause the apparatus to:
select each mean value of the set of mean values as a nearest data point to a calculated real mean value.

18. The apparatus of claim 14, wherein the instructions are further executable by the processor to cause the apparatus to:
identify the one or more data points of the subset of the plurality of data points within the bandwidth of each centroid using a Euclidean distance calculation of a distance between each of the one or more data points and each centroid.

19. A non-transitory computer-readable medium storing code for data processing at a database system, the code comprising instructions executable by a processor to:
receive, at the database system, a plurality of data objects, each data object of the plurality of data objects associated with one or more data attributes;
arrange the one or more data attributes along one or more dimensions;
define a plurality of data points for a set of the arranged one or more data attributes;
initialize a plurality of centroids on a subset of the plurality of data points;
identify, for each centroid of the plurality of centroids, a mean value of one or more data points of the plurality of data points within a bandwidth of each centroid of the plurality of centroids to generate a set of mean values;
identify, for each mean value of the set of mean values, a set of data attributes corresponding to data points within a range of the mean value; and
perform a frequent pattern (FP) analysis procedure on each set of data attributes corresponding to each mean value.

20. The non-transitory computer-readable medium of claim 19, wherein the instructions are further executable by the processor to:
iterate identification of the mean value for the one or more data points using the set of mean values as the plurality of centroids until satisfaction of a merging threshold by the set of mean values to generate a set of final mean values, wherein the set of data attributes are identified within the range of each of the final mean values and the FP analysis procedure is performed on each set of data attributes corresponding to each final mean value.

* * * * *